United States Patent
Harris

(10) Patent No.: US 10,414,677 B2
(45) Date of Patent: Sep. 17, 2019

(54) OZONE-ASSISTED FLUID TREATMENT APPARATUS AND METHOD

(71) Applicant: Charles E. C. Harris, Chaing Rai (TH)

(72) Inventor: Charles E. C. Harris, Chaing Rai (TH)

(*) Notice: Subject to any disclaimer, the term of this patent is extended or adjusted under 35 U.S.C. 154(b) by 118 days.

(21) Appl. No.: 15/269,966

(22) Filed: Sep. 19, 2016

(65) Prior Publication Data

US 2017/0066667 A1    Mar. 9, 2017

Related U.S. Application Data

(60) Continuation-in-part of application No. 14/070,068, filed on Nov. 1, 2013, which is a continuation-in-part of application No. 13/925,391, filed on Jun. 24, 2013, which is a division of application No. 12/686,315, filed on Jan. 12, 2010.

(Continued)

(51) Int. Cl.
| | |
|---|---|
| C02F 1/28 | (2006.01) |
| C02F 1/32 | (2006.01) |
| C02F 1/78 | (2006.01) |
| E04H 4/12 | (2006.01) |
| C02F 1/00 | (2006.01) |
| C02F 101/20 | (2006.01) |
| C02F 103/42 | (2006.01) |

(52) U.S. Cl.
CPC ............ *C02F 1/78* (2013.01); *E04H 4/1281* (2013.01); *C02F 1/001* (2013.01); *C02F 1/28* (2013.01); *C02F 1/325* (2013.01); *C02F 2101/203* (2013.01); *C02F 2101/206* (2013.01); *C02F 2103/42* (2013.01); *C02F 2201/782* (2013.01); *C02F 2201/784* (2013.01); *E04H 4/1209* (2013.01); *Y02W 10/37* (2015.05)

(58) Field of Classification Search
CPC .. C02F 1/001; C02F 1/28; C02F 1/325; C02F 1/78; C02F 2101/203; C02F 2101/206; C02F 2103/42; C02F 2201/782; C02F 2201/784; E04H 4/1209; E04H 4/1281; Y02W 10/37
See application file for complete search history.

(56) References Cited

U.S. PATENT DOCUMENTS

| | | | | |
|---|---|---|---|---|
| 5,190,648 | A | * | 3/1993 | Ramsauer ................. C02F 1/78 210/172.1 |
| 9,316,011 | B2 | * | 4/2016 | Harris ....................... C02F 1/78 |

(Continued)

*Primary Examiner* — Lucas A Stelling
(74) *Attorney, Agent, or Firm* — Donald L. Bartels; Bartels Law Group

(57) ABSTRACT

An apparatus for treating fluid in a main reservoir includes an auxiliary reservoir and filter located outside the main reservoir. Ozonated air bubbles are injected by a diffuser into a lift tube containing fluid from the main reservoir. The fluid flows up the lift tube and into the auxiliary reservoir due to the expansion of the ozonated air bubbles as they go up the lift tube. The fluid is caused to pass through the auxiliary reservoir and filter and back into the main reservoir as a result of the flow of ozonated air in the lift tube. A UV germicidal lamp is positioned in the path of fluid flow downstream of said diffuser. In an alternate embodiment, fluid flow to and from the main reservoir is via conduits normally used to connect the main reservoir to a conventional high pressure water pump and filter.

16 Claims, 7 Drawing Sheets

Related U.S. Application Data

(60) Provisional application No. 62/220,142, filed on Sep. 17, 2015, provisional application No. 61/144,093, filed on Jan. 12, 2009.

(56) References Cited

U.S. PATENT DOCUMENTS

| | | | | |
|---|---|---|---|---|
| 2004/0226893 | A1* | 11/2004 | Kamimura | C02F 1/325 210/748.15 |
| 2007/0248488 | A1* | 10/2007 | Denkewicz, Jr. | C02F 1/78 422/24 |
| 2010/0200517 | A1* | 8/2010 | Harris | C02F 1/78 210/760 |
| 2012/0085691 | A1* | 4/2012 | Cummins | C02F 9/00 210/192 |

* cited by examiner

OZONE-ASSISTED FLUID TREATMENT APPARATUS AND METHOD

PRIORITY

The present application is a continuation-in-part of, and claims priority to co-pending U.S. patent application Ser. No. 14/070,068, filed Nov. 1, 2013, the entirety of which is incorporated herein by reference. The present application also claims priority to U.S. Provisional Patent Application Ser. No. 62/220,142, filed Sep. 17, 2015, the entirety of which is incorporated herein by reference. U.S. patent application Ser. No. 14/070,068 is a continuation-in-part of and claims priority to U.S. patent application Ser. No. 13/925,391, filed Jun. 24, 2013, now U.S. Pat. No. 8,753,523, the entirety of which is incorporated herein by reference. U.S. patent application Ser. No. 13/925,391 is a division of, and claims priority to U.S. patent application Ser. No. 12/686,315, filed Jan. 12, 2010, now U.S. Pat. No. 8,470,170. The present application also claims priority to U.S. Provisional Patent Application Ser. No. 61/721,423, filed Nov. 1, 2012, and U.S. Provisional Patent Application Ser. No. 61/144,093, filed Jan. 12, 2009, the entireties of both of which are incorporated herein by reference.

FIELD OF THE INVENTION

This invention relates in general to fluid treatment systems and methods, and more specifically to apparatus for treating fluid from a fluid reservoir by injecting ozonated air into a lift tube containing fluid from the fluid reservoir and the subsequent irradiation of the ozonated water by a UV lamp.

BACKGROUND

Ozone ($O_3$) is a gas with strong oxidation properties that has been used in many applications including the pool and spa industry as well as treating water in water storage tanks since the early 1900's. Ozone is typically produced by high-intensity ultraviolet (UV) light or by a high-voltage electric field. The normal byproduct of ozone is oxygen ($O_2$). Ozone is created when either UV light or a corona discharge (CD) is applied to oxygen. The oxygen disassociates into single oxygen atoms which recombine into ozone. Ozone has a half life of about 2 to 12 hours in air and about 20 minutes when dissolved in water. Ozone is 13 times more soluble in water than oxygen. Ozone oxidizes and disinfects and deodorizes. Ozone also micro-flocculates iron and manganese and kills bacteria 3,000 times faster than chlorine, kills viruses, algae spores, and some parasites, precipitates heavy metals, controls formation of scales, and oxidizes oils.

Ozone is typically introduced into water to be treated by simply bubbling ozone and air into a tank of water with the use of a diffuser stone (known as an ozone aeration system) or by a venturi eductor used in conjunction with a water pump. Passing water through a venturi eductor creates a suction which draws in ozone and mixes the ozone gas with water. The ozone gas is typically introduced into a contact tank from which undissolved ozone gas is vented, or it is introduced directly into a storage tank and bubbles up through the tank and out the top of the tank. This same type of system has been used to inject ozone into water in swimming pools and spas. In some cases, spa systems have used existing "spa hydrotherapy jets" as the means to "suck in" the ozone gas and mix the gas with the spa water.

Ozone is used in combination with various chemicals in the pool and spa industry. Ozone is also used to treat iron, manganese, and hydrogen sulfide in well water and to kill pathogens in, surface waters such as lakes and streams. Ozone systems come in many varieties and ozone is produced in many ways known in the art.

Ozone water treatment systems for water storage tanks are designed to clean "raw" water, e.g., well water, whereas systems for pools and spas are designed to keep treated water clean as it is used over and over again. Prior art ozone aeration systems typically include a filter to remove impurities in a reservoir of water. One prior art system teaches a water purification apparatus suspended inside a water tank. The apparatus includes a filter for filtering the water and a lift tube containing ozonated air bubbles to add ozone to the water in the tank. Such a prior art system is disclosed in U.S. Pat. No. 5,190,648 to Ramsauer, issued Mar. 2, 1993. In the Ramsauer type of system, an ultraviolet (UV) ozone generator utilizes UV light at a nanometer wavelength of 185 that shines on feed gas (air or concentrated oxygen) flowing through a suitable tube chamber. The ozone is injected into the water in an airstream and the airstream causes the water to flow upwardly in the lift tube and circulate from the reservoir through the lift tube for purification. Fundamentally, UV generator mimics the natural process responsible for the production of the ozone layer in the earth's outer atmosphere. In the stratosphere, high-energy UV radiation from the sun splits diatomic oxygen that results in ozone formation. Ozone generators based on UV radiation typically produce relatively small amounts of ozone at a very low concentration.

In the Ramsauer system, air containing ozone generated by an ozone generator is injected into the bottom of the lift tube using a diffuser, which causes the ozonated air to be converted into bubbles. The ozonated air bubbles up through the water in the lift tube and into the water tank. Excess ozonated air escapes through the top of the tank. As taught in Ramsauer, the lift tube is part of an in-the-tank filter module. The ozone gas mixing and filtration and circulation of the water are accomplished within the filter module assembly. The action of the bubbles rising and expanding in the lift tube causes a current flow, which causes the water to be drawn through the filter where the water is filtered with each pass to thereby filter the water prior to its contact with the ozonated air.

Prior art ozone water treatment systems are generally simple to install since they are positioned inside the fluid reservoir and therefore require no cutting into the wall of reservoir, whether it be a pool, spa, or tank, to install separate lines. However, such a "single" reservoir fluid treatment system is more difficult to maintain, because the filter needs to be pulled from the reservoir for cleaning and maintenance. In addition, the Ramsauer system, for example, does not treat the excess ozonated air bubbles emanating from the fluid in the reservoir after treatment, for destruction or to channel it elsewhere for some other use. There is no mechanism for preventing the pool or spa user from being exposed to this ozonated air bubbling off the surface of the water, and thus having to suffer the damaging effects of ozone on the user's mucus membranes, eyes, and skin.

In the prior art, an alternative method for treating water to remove pathogens is to use UV germicidal lamps in disinfection water treatment systems. In such systems, the UV lamp is placed in a flow of water to expose pathogens to UV radiation. These lamps use a different frequency of the electro-magnetic spectrum than is used with UV ozone producing lamps. The optimum wavelength to effectively inactivate microorganisms, according to the prior art, is in the range of 250 to 270 nm. The intensity of the radiation emitted by the lamp dissipates as the distance from the lamp increases.

According to Wikipedia, "UV light is electromagnetic radiation with wavelengths shorter than visible light. UV can be separated into various ranges, with short-wavelength UV (UVC) considered 'germicidal UV.' At certain wavelengths, UV is mutagenic to bacteria, viruses and other microorganisms. Particularly at wavelengths around 250 nm-260 nm, UV breaks molecular bonds within micro-organismal DNA, producing thymine dimers that can kill or disable the organisms." See, https://en.wikipedia.org/wiki/Ultraviolet_germicidal_irradiation.

Many companies offer UV disinfection system for the pool and spa industry. For example, a company called Spectra Light UV sells UV germicidal systems for pools. It states on its website: "Ultraviolet (UV) pool sanitizers utilize a cutting-edge, non-chemical process that uses germicidal UV light rays to sanitize water, air and surfaces that may be contaminated. UV pool sanitizers emit a high intensity germicidal light ray that alters or disrupts the DNA or RNA of targeted organisms such as algae, bacteria, viruses, cysts and protozoa. The highly concentrated electromagnetic energy also destroys organic matter, eliminating the formation of dangerous chlorine by-products. The UV light spectrum was discovered with the identification of light waves. Scientists have known for almost a century that UV is a powerful neutralizer of algae, bacteria and viruses. They also discovered that the optimal ultraviolet wavelength to destroy microorganisms was between 250 and 270 nm. The results led scientists to incorporate UV sanitizer technology into sterilizing drinking water more than 30 years ago. Ultraviolet disinfection has since gained in popularity in drinking water and wastewater disinfection in the last 10 years. Now UV sanitizers disinfect a significant percentage of all drinking and wastewater. Typical germicidal UV sanitizers bombard the passing water flow with a high intensity germicidal ultraviolet ray that destroys more than 60 waterborne pathogens, including algae, bacteria, cysts, and viruses. The UV sanitizing lamp is housed in an industrial graphite housing optimized for high flow rates. A highly specialized quartz glass sleeve protects the lamp from passing water while transmitting 99.9% of the UV light. The highly concentrated electromagnetic energy destroys organic matter and eliminates the formation of dangerous chlorine by-products called chloramines that commonly lead to red, stinging eyes, skin irritations, asthma and allergies. This energy penetrates the cell walls of bacteria, viruses, algae, cysts and all pathogens." See, http://www.spectralightuv.com/how-uv-works.

Using a system to inject ozone into the water and then, downstream, using a UV germicidal UV lamp for water purification is known in the art. This type of system has many advantages and data shows that the advantages are greater than what might be expected. This is because the use of injecting ozone into the water first and then shining UV radiation makes advanced oxidation products (AOPs). AOPs can achieve greater water treatment results than either ozone or UV disinfection alone. As stated in one prior art publication, Ultraviolet (UV) and ozone are clearly established as viable secondary disinfection methods to chlorine for combating recreational waterborne illnesses (RWIs). As recommended by the Centers for Disease Control and Prevention (CDC) in its recently issued Model Aquatic Health Code, UV and ozone help inactivate Cryptosporidium, the primary causal agent of RWIs, chlorine, unfortunately, is not effective against Cryptosporidium—it is not the end-all, be-all sanitizer, but neither is UV or ozone, which is why, when they are used as a complement to chlorine, greater microbial efficacy is achieved. Microbial inactivation studies employing a combination of UV and ozone have been reported for decades in water treatment. These studies have been made almost exclusively in non-swimming pool applications, so less notice may have been taken of them within the pool and spa industry. In these research investigations, which span multiple water treatment applications, researchers observed a synergistic effect when UV and ozone were used in combination for disinfection and oxidation purposes. That is to say, the observed results were greater than the expected contributions of their parts. The synergistic action, as observed by many investigators, has been attributed to the formation of hydroxyl radicals when UV light interacts with ozone. The use of hydroxyl radicals in water treatment is commonly referred to in scientific literature as advanced oxidation. The potent nature of hydroxyl radicals results in what is effectively a one-two-three punch when UV and ozone are used together.

See, e.g., a study published in 2006 by Magbanua, et al. According to Magbanua, et al., the synergy associated with UV/ozone water treatment is attributed to the presence of supplementary hydroxyl radicals. In pure water, ozone reacts with hydroxide ions to form hydroxyl ions via a complicated pathway. The combined use of UV and ozone promotes the formation of additional hydroxyl radicals by photolysis of ozone through a hydrogen peroxide pathway.

As found in Magbanua, et al., aqueous ozone absorbs UV radiation at wavelengths of 200 to 310 nm, and, in turn, decomposes to form hydrogen peroxide. Hydrogen peroxide then further reacts with UV to produce hydroxyl radicals. Hydroxyl radicals are extremely fast-reacting, potent, non-selective chemical species. In fact, their oxidation power is recognized as being far more potent than chlorine gas, hypochlorous acid or ozone. Furthermore, the reactivity of hydroxyl radicals has long been recognized as extremely fast—in some instances as much as 1 million times faster-acting than ozone for bond breaking via chemical oxidation. For these reasons, the inactivation rate of waterborne pathogens is much greater due to the additional oxidizing power provided by the supplemental hydroxyl radicals.

The trio of UV, ozone, and, hydroxyl radicals ("the trio") have been found to be effective for water treatment. This dual technology approach, commonly referred to as advanced oxidation, has the capability of achieving oxidation and disinfection. In addition to the research by Magbanua, et al., the combined effects of UV, ozone, and hydroxyl radicals as disinfectants were demonstrated in work performed at the University of Arizona's Water Quality Center under a grant sponsored by the U.S. Department of Homeland Security. In that research, the disinfection performance of UV and ozone against adenovirus and *Naegleria fowleri* was shown to be remarkably improved when paired together. Importantly, this study established the synergistic effect of UV and ozone against viruses and amoebas, augmenting prior results against bacteria and parasites. Taken together, the potency of a UV/ozone combination as a disinfection approach seems unparalleled.

The trio as Oxidizers: The benefits of pairing UV with ozone do not stop with disinfection performance. While UV has virtually no oxidizing ability, the resulting hydroxyl radicals created from UV and ozone are tremendous oxidizers. As is the case with disinfection, the literature is replete with studies that reflect the superior oxidation performance of hydroxyl radicals formed from UV and ozone. The implications of these findings are significant for swimming pool and spa applications, because urea and chloramines limit chlorine's effectiveness and affect bather comfort. Furthermore, chloramines can volatilize, creating an unpleasant "fishy" or "chlorine" odor, and wreak havoc on indoor materials due to their corrosive nature.

The trio as a Water Treatment Strategy: The synergy that is provided with respect to both oxidation and disinfection is invaluable in most instances. According to the prior art, however, neither UV nor ozone, nor the resulting hydroxyl radicals, provide a lasting disinfection residual. Therefore, in some applications, such as pools and spas, chlorine is still a necessary part of the overall treatment strategy. To this end, the Centers for Disease Control & Prevention (CDC) recommends to use of either UV or ozone as a secondary disinfectant to chlorine for swimming pools and spas. See, http://www.wqpmag.com/power-three.

More recently, the CDC recommends in its Model Aquatic Health Code that the UV and ozone technologies as secondary disinfectants to combat outbreaks of recreational water illnesses in aquatic facilities. As one prior art commentator indicated, the net benefits of the UV/ozone combination are attributed to the formation of hydroxyl radicals, resulting in the "power of three" for increased disinfection and oxidation efficacy.

UV & Ozone Technology Integration: It is certainly possible to install a separate ozone system before or after a UV system to achieve a dual disinfection strategy. To do so, however, requires two separate systems and installations, which can be expensive. Fortunately, some low-pressure UV lamps can emit two wavelengths: 185-nm UV light for the generation of ozone and 254-nm UV light for inactivating microorganisms. These dual-wavelength lamps are available from most UV suppliers, cost about the same as single-wavelength UV lamps and can be engineered into a single system to deliver simultaneous UV and ozone water treatment. Creating a UV/ozone combination system requires a fundamental understanding of how a conventional low-pressure UV system is configured. In such systems, UV lamps are housed in a vessel so that water passing through is exposed to the UV rays. To do this, each lamp (and there may be more than one) is surrounded with a quartz glass sleeve. This sleeve performs two key functions, it provides a physical barrier between the lamp and the water, and it allows the lamp's UV rays to be readily transmitted into the water phase. If the UV lamps used in the vessel are single-wavelength lamps, also known as germicidal lamps (i.e., lamps that emit only in the range of 254-nm UV light), then the system is a conventional UV system.

To convert a conventional system into a combination UV/ozone system requires two key steps: replacing the UV lamp with a dual-wavelength model, and providing a means to remove the ozone created inside the quartz sleeve area and inject it into the water phase. While there are a variety of methods to extract ozone from the sleeve area, the simplest and most common is through the use of a venturi, a favored approach because venturis have no moving parts and can utilize the water flow in the piping to create a suction, or ozone draw. As water passes through the plumbing, the venturi will draw air from the source to which it is connected. If the venturi is connected via tubing to the sleeve area around a lamp, the air it draws will contain ozone, as the UV light produces ozone from air using its 185-nm wavelength. When more than one lamp is used, a simple manifold can combine the air draw from all of the sleeves. The ozonated water that enters the vessel is struck with the 254-nm UV light. It is the 254-nm UV light, not the 185-nm UV light, that is transmitted through the glass sleeve surrounding a lamp. The 254-nm UV light converts the ozone into hydroxyl radicals, creating the one-two-three punch described above. While the quantity and concentration of ozone generated are small, it is known that this can be significant in contributing to the effects of both disinfection and oxidation. The injection of ozone can be done before or after the UV light, but ozone must be injected before the UV vessel to take advantage of hydroxyl radical formation. When performed this way, no residual leaves the vessel, as the half-life of hydroxyl radicals is a fraction of a second. As a result, no ozone degassing or destruction chamber is needed, as is the case when corona discharge ozone systems are used.

A combination ozone/UV germicidal lamp unit connected to and operated with a water pump pool recirculating system is available through a company called Del Ozone. According to Del Ozone, by combining ozone and germicidal UV in a single unit, the "UV light interacts with the ozone, and the resulting chemical reaction generates hydroxyl free radicals. Hydroxyl free radicals have even more oxidation potential than ozone, the power of the whole system is increased; creating the synergy of Advanced Oxidation Process (AOP)". See: http://www.delozone.com/files/4-1958-01_Rev_C.pdf.

SUMMARY OF THE INVENTION

The present invention solves the limitations of prior art fluid treatment systems by using an auxiliary reservoir and ozonated air bubbles in a lift tube to treat fluid with ozone. The ozonated water is then treated with radiation from a germicidal UV lamp. The treated fluid is then returned to a main fluid reservoir. The main fluid reservoir may be a pool, spa, water tank, or some other fluid storage container. After ozonation of the fluid, any excess ozone gas emanating from the fluid may be captured and either destroyed or channeled to another spot prior to the return of the fluid to the main fluid reservoir.

In one embodiment the fluid treatment apparatus according to the present invention. An apparatus for ozone-aerating and filtering fluid in a main fluid reservoir comprising: an auxiliary fluid reservoir positioned adjacent to and outside of the main fluid reservoir; a lift tube positioned outside of the main fluid reservoir and having an upper end and a lower end, said lift tube upper end open within the auxiliary fluid reservoir, said lift tube extending below the auxiliary fluid reservoir a predetermined length; a first conduit for enabling fluid in the auxiliary fluid reservoir to flow into the main fluid reservoir; a second conduit for enabling fluid to flow by gravity from the main fluid reservoir into the lower end of said lift tube; a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first conduit and into the main fluid reservoir at the same time causing fluid to be drawn through said second conduit from the main fluid reservoir and into said lift tube; a UV germicidal lamp positioned in the path of fluid flow downstream of said diffuser, and a low pressure fluid filter positioned outside of the main reservoir and in the fluid path formed by said first and second conduits, said lift tube, and said auxiliary fluid reservoir, for filtering the fluid flowing therein.

In a second embodiment, the fluid treatment apparatus according to the present invention is connected to already existing conduits that connect fluid in a main reservoir to a conventional high pressure water pump and filter assembly being used to filter the fluid, to augment the filtering provided by the conventional filter assembly. This eliminates the need for separate openings to be made in the main reservoir for installation of the fluid treatment apparatus according to the invention. A check valve is added in each of the conduits that connect the fluid treatment apparatus to the main reservoir's preexisting conduits. The first check valve is installed in the conduit connected to the existing conduit on one side of the conventional water pump to prevent the drainage of fluid from the auxiliary reservoir according to the present invention when the conventional pump is turned on and functioning to suck fluid out of the main reservoir. The second check valve is installed in the conduit connected to the existing conduit on the return side of the conventional water pump to prevent the flooding of the auxiliary reservoir by the injection of fluid coming out of the water pump. In this way, when the conventional water pump is off, the fluid treatment apparatus according to the present invention operates normally. When the conventional water pump is on, fluid flow through the fluid treatment apparatus is prevented.

In one embodiment, ozonated air bubbles in a lift tube lift fluid obtained from one of the main reservoir's preexisting conduits into the auxiliary reservoir positioned to the side of the main reservoir. The flow of fluid in the lift tube increases the height of the fluid level in the auxiliary reservoir above the fluid level of the main reservoir and this difference in fluid level creates a gravity flow of fluid from the auxiliary reservoir back to the main reservoir, via the other preexisting conduit, and allows for the fluid to be filtered by means of a filter positioned outside of the main reservoir and in the path of fluid flow. This enables the filter to trap impurities in the fluid while the ozonated air adds ozone to the fluid in the lift tube by bubble contact. After fluid treatment, the excess ozonated air that bubbles off the surface of the fluid in the auxiliary reservoir may be captured and either destroyed or channeled to another location.

In one embodiment, the fluid filter is installed in the auxiliary reservoir. In this embodiment, the auxiliary fluid reservoir functions to both filter and ozone treat the fluid before sending the treated fluid to the main fluid reservoir. When new fluid is added to the auxiliary reservoir, this gives the filter and ozone treated water an initial opportunity to remove impurities before the new fluid flows into the main reservoir.

Other embodiments are as shown in the figures.

According to one embodiment, the present invention is an apparatus for ozone-aerating and filtering fluid in a main fluid reservoir, said main fluid reservoir including a high pressure water pump and a high pressure filter, a first conduit for enabling fluid in said main fluid reservoir to flow to said water pump and high pressure filter, and a second conduit for enabling fluid to flow from said water pump and high pressure filter to said main fluid reservoir, for enabling the circulation of fluid in said main fluid reservoir through said water pump and high pressure filter when the water pump is on, comprising: an auxiliary fluid reservoir positioned adjacent to and outside of the main fluid reservoir; a lift tube positioned outside of the main fluid reservoir and having an upper end and a lower end, said lift tube upper end open within the auxiliary fluid reservoir, said lift tube extending below the auxiliary fluid reservoir a predetermined length; a third conduit for enabling fluid in the auxiliary fluid reservoir to flow into the main fluid reservoir via said second conduit, said third conduit including a check valve for preventing fluid flow in a direction from said second conduit to said auxiliary fluid reservoir; a fourth conduit for enabling fluid to flow by gravity from the main fluid reservoir into the lower end of said lift tube via said first conduit, said fourth conduit including a check valve for preventing fluid flow in a direction from the lower end of said lift tube to said first conduit; a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first fluid conduit and into the main fluid reservoir at the same time causing fluid to be drawn through said second fluid conduit from the main fluid reservoir and into said lift tube; a UV germicidal lamp positioned in the path of fluid flow downstream of said diffuser; and a low pressure fluid filter positioned outside of the main reservoir and in the fluid path formed by said third and fourth fluid conduits, said lift tube, and said auxiliary fluid reservoir, for filtering the fluid flowing therein.

A method for ozone-aerating and filtering fluid in a main fluid reservoir comprises the steps of: injecting ozonated air into a lift tube external to a main fluid reservoir whose bottom is connected to the main fluid reservoir by a second conduit; collecting said ozonated fluid in an auxiliary reservoir; causing said fluid in said auxiliary reservoir to flow back into the main fluid reservoir; and treating said ozonated fluid with a UV germicidal lamp.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention and not to limit the claimed invention thereto. The drawings are intended to illustrate major features of the exemplary embodiments in a diagrammatic manner. The drawings are not intended to depict every feature of actual embodiments nor relative dimensions of the depicted elements, and are not drawn to scale. Note also that reference symbols or names are used in the Figures to indicate certain aspects or features shown therein, with reference symbols common to more than one Figure indicating like components, aspects or features shown therein.

The features, advantages, and benefits of the present invention will become more apparent from the following description taken in conjunction with the accompanying drawings, which are presented solely for exemplary purposes and not with the intent to limit the invention thereto, and in which.

DETAILED DESCRIPTION

Figure 1:
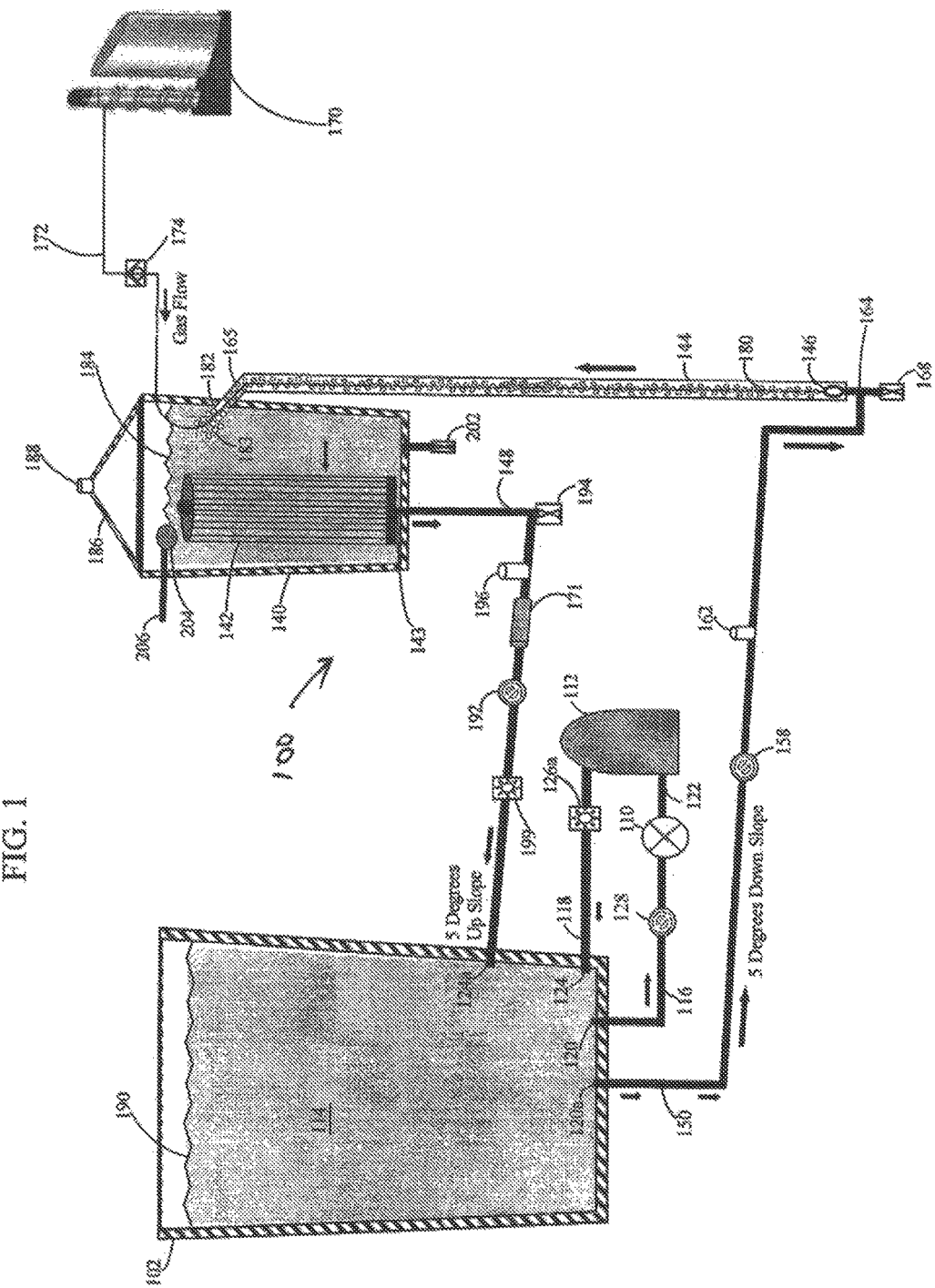
FIG. 1 illustrates an ozone-assisted fluid treatment apparatus for a fluid reservoir according to one embodiment of the present invention.

FIG. 1 illustrates an ozone-assisted fluid treatment apparatus 100 for a fluid reservoir 102 according to one embodiment of the present invention. FIG. 1 illustrates the ozone-assisted fluid treatment apparatus 100 connected to the main fluid reservoir using separate inflow and outflow lines or conduits 148 and 150. Optionally, there may also be a conventional high pressure water pump 110 and high pressure filter 112 connected to the main fluid reservoir 102 by separate conduits 116 and 118 to filter the fluid 114 in main fluid reservoir 102 when the water pump 110 is on. An ozone generator 170 with an internal air pump supplies ozonated air to the apparatus 100. FIG. 1 illustrates the use of a UV germicidal lamp 171 to treat the ozonated fluid in apparatus 100. In the embodiment shown in FIG. 1, UV lamp 171 is positioned to irradiate the fluid in the fluid return line 148 of the ozone-assisted fluid treatment system 100, at a point where there are concentrated levels of ozone in the fluid. By combining ozonated fluid and a germicidal UV lamp in a single apparatus 100, the UV light interacts with the ozone, and the resulting chemical reaction generates hydroxyl free radicals in the fluid flowing in conduit 148. Hydroxyl free radicals have even more oxidation potential than ozone. As a result, the purification power of system 100 is increased.

The components of the fluid treatment apparatus 100 according to one embodiment of the present invention, as seen in FIG. 1, includes an auxiliary fluid reservoir 140, a lift tube 144, conduits 148 and 150, a UV germicidal lamp positioned in conduit 148, and a low pressure fluid filter 142. Conduit 148 connects the fluid output by auxiliary fluid reservoir 140 to the in-flow opening 124 of main fluid reservoir 102. Conduit 150 enables fluid flow from the main fluid reservoir 102 to the base of lift tube 144. The ozonated air from ozone generator 170 is coupled to a diffuser 146 positioned inside lift tube 144 preferably near or at its base.

As indicated in the Background above, the UV lamp or lamps used to create ozone and the UV disinfection lamp emit UV radiation at different frequencies and use different materials. In one embodiment, the UV ozone generator 170 uses UV radiation to create ozone out of air (or in some cases, from pure oxygen gas), but no fluid passes through, or is inside the ozone generator 170. The UV lamp in ozone generator 170 uses a quartz jacket to allow a specific light frequency, in the range of 195 nm, to pass through the lamp to the air. The UV germicidal lamp 171 attached to the fluid return line 148, on the other hand, generates a different wavelength, preferably in the range of 250-270 nm that functions to cause UV disinfection of the fluid rather than for creating ozone gas. Many companies offer products using ozone and UV disinfection lamp combinations. A unique aspect of the present invention is that the ozone-assisted fluid treatment system 100 creates the flow of fluid through system 100 with only an air pump; i.e., the injection of ozonated air into the ozone-assisted fluid treatment apparatus 100 causes the fluid to be aerated, circulated out of and back into the main fluid reservoir 102, filtered, and treated with ozone and UV disinfection all at the same time.

In another embodiment, only one UV lamp is needed to generate both the ozonated air and the UV disinfection radiation. A dual radiation lamp can be used with the apparatus 100 wherein the air from the air pump (shown at 172 in FIG. 2) is first irradiated with UV radiation at 195 nm by the UV lamp and then, after the ozonated air is injected into the fluid in the apparatus 100, the fluid is irradiated by UV radiation in the range of 250-270 nm from the same UV lamp. It is within the ordinary skill in the art to arrange separate conduits to enable both air and fluid to be separately irradiated by the same UV lamp.

There are many types of UV germicidal lamps which may be installed with the ozone-assisted fluid treatment apparatus 100 according to the present invention. Essentially, a UV germicidal lamp is placed inside a pipe. One company called Hanovia, shows a number of different models which could be installed in-line with the out-flow of the ozone-assisted fluid treatment system. See, http://www.hanovia.com/uv-products. Other exemplary lamps suitable for pools and spas are described by a company called Delta UV. On its website, it shows lamps of various intensities, for example, the "EA Series" UV germicidal lamps. See http://deltauv.b2bmarketsites.us/wp-content/uploads/2015/04/EA_SERIES_2015_WEB.pdf.

Other exemplary types of lamps are shown on the following website which shows, for example, a 20 watt submersible UV germicidal lamp, which may be placed inside the lift tube or placed in the Ozone-assisted fluid treatment tank return line. It should be noted that these lamps are intended for aquariums and not for swimming pools and spas and therefore, the safety standards are not the same as one would require for use with humans (as opposed to fish). However, the types of units shown could be easily modified by a person skilled in the art and upgraded to provide adequate safety against electrical shock, lamp breakage, etc. See, http://www.lelong.com.my/ai-lin-bi-20w-uv-submersible-germicidal-lamp-mypowertools-117812791-2013-11-Sale-P.htm.

As seen in FIG. 1, ozone generator 170 pumps a mixture of ozone and air into a diffuser stone 146 positioned at the bottom of lift tube 144 filled with fluid from the main reservoir 102, to generate bubbles in the fluid. These bubbles expand as they rise up the lift tube. These bubbles create an upward flow in the fluid contained in the lift tube. The flow of fluid in the lift tube causes the fluid to flow through filter 142 without the use of any conventional fluid pump. The fluid flows past the filter solely due to the effect of ozonated air bubbles released inside the lift tube. The upper end of the lift tube is preferably positioned to discharge the fluid in the lift tube into an auxiliary reservoir. The fluid in the auxiliary reservoir flows back into the main reservoir via the force of gravity. As a result, the fluid treatment apparatus 100 according to the present invention produces a gentle, controlled flow of ozonated and UV germicidally treated fluid into a pool, spa, or storage tank. Where the main reservoir is a pool or spa, one goal is to create a more desirable experience for a user of the pool or spa, as compared to a system where a conventional fluid pump is used to supply ozonated fluid. The level of ozone in the treated fluid can be controlled by various system parameters, including, but not limited to, ozone generation rate, ratio of air and ozone in the mixture that is released in the lift tube fluid by the diffuser, the dimensions of the auxiliary reservoir and the main reservoir, the dimensions of the lift tube, etc.

Low pressure fluid filter 142 may be positioned anywhere in the fluid path defined by the conduits 148 and 150 and auxiliary fluid reservoir 140 in order to filter the fluid flowing in this path. Filter 142 preferably includes a filter media comprising folds of continuous filament spun-bonded polyester called Reemay® because of its high efficiency and large surface area. However, other conventional filter media may be used, such as polypropylene fibers, and sand, or diatomaceous earth filters may be used. In the embodiment shown in FIG. 1, fluid filter 142 is located in auxiliary fluid reservoir 140. Filter 142 could also be in a separate filter tank (not shown) connected along either conduit 148 or conduit 150. Such a separate filter tank may include a removable access lid and a drain valve for enabling filter 142 to be periodically drained and cleaned.

In many parts of the world, many pools, spas, surge tanks, and storage tanks are only one meter high. Placing a diffuser stone inside such a reservoir at a depth of only one meter reduces the time allowed for ozone and oxygen to dissolve into the water, with the result that the efficiency of such a fluid treatment system is reduced.

A key aspect of each of the embodiments of the present invention described herein is that the lift tube length is not limited by the depth of the reservoir containing the fluid to be treated. The present invention enables the efficient use of ozone aeration technology by allowing the diffuser stone to be positioned preferably at about 3 meters below the surface of the water in the main fluid reservoir with a flow rate of ozonated air at about 3 to 3.5 psi, regardless of whether the pool, spa or other fluid reservoir is deep or shallow (or a storage tank is tall or short), by the use of a lift tube whose lower end is at a lower level than the bottom of the reservoir. In general, the deeper the diffuser stone is positioned in a lift tube, the more that ozone is able to dissolve into the fluid in the lift tube. In other words, the deeper the diffuser stone, the longer the bubbles are in contact with the fluid, thereby increasing the amount of ozone that dissolves into the fluid in the lift tube as the bubbles rise to the top. On the other hand, the deeper the diffuser stone, the greater the air pressure needs to be in order to prevent a drop off in the amount of ozonated air bubbles generated by the diffuser. Thus, for a given ozone generator having an air pump with a fixed air pressure output, a diffuser positioned deeper in the lift tube may result in a decrease in the amount of air bubbles emanating from the diffuser, with a resulting decrease in the circulation flow of water through the treatment system.

Although water is the preferred fluid to be treated according to the present invention, persons skilled in the art will appreciate that the same apparatus can be used for treating other fluids (the term "fluid" encompasses both liquid and gas and liquid/gas mixtures) without diverting from the scope of the invention. Similarly, the term "reservoir" encompasses spas, pools, storage tanks, treatment/filter tanks, etc. Additionally, the term "ozonated air" or "ozone-treated air" are synonymous, meaning a volume of air and ozone gas mixed together.

Ozone in high concentrations destroys pathogens, spores, algae and various germs and it also oxidizes a number of impurities such as iron, manganese, oils and organic wastes. According to the present invention, a high volume of treated air is pumped into the fluid along with a relatively low concentration of ozone. Ozone in low concentrations may not kill all pathogens. However, ozonated fluid helps to hinder the growth of many bacteria and may reduce pH fluctuations by, for example, obstructing the nitrogen cycle. The relatively gentle fluid flow past the filter also helps to keep the fluid clean too, because many impurities that would normally be pushed through a filter as a result of the force applied by a conventional fluid pump to the fluid are instead trapped by the ozone aeration and filtration apparatus according to the present invention. The advantage of using an ozone aeration system according to the present invention is that it renders the fluid in the pool, spa, or tank rather inhospitable as a growth medium; i.e., bacteria and algae that might otherwise flourish in another environment seem to be greatly reduced because of the lack of nutrients and other conditions needed for growth and reproduction. While the lift tube and auxiliary reservoir may contain fluid that has detectable levels of dissolved ozone in the fluid, it is not certain that the minimum recommended detectable levels of ozone required for disinfection (0.05 ppm) would be present. However, the low level of ozone concentration may add other benefits to the aeration and filtration system by allowing the filter media itself to form a bio-film composed of protozoa, bacteria, algae, and other living organisms that act as a kind of bio-filter itself with its own "ecosystem". As the water passes through the bio-film, the bio-film consumes and traps many impurities which would otherwise contaminate the pool, spa, or water tank, impurities that would otherwise create conditions fostering the growth of bacteria, algae, as well as create chemical conditions which might make the water unusable for humans. For example, such impurities could otherwise create variations in the nitrogen cycle (making ammonia) and volatile fluctuations in the acid/base pH of the water. A very high level of ozone and the use of chemicals such as chlorine, bromine, or salt (which is used to make chlorine), as used in conventional water treatment systems, may hinder the formation of such a biofilm on the filter media, or destroy such the biofilm if it has already formed.

The concept of using a biofilm for water treatment is not new. However, the inventor is not aware of its use for pools and spas. Normally, the idea comes from its use with slow sand filters which form a gelatinous layer called a Schmutzdecke (a grime or filth cover in German coined by the scientist who discovered its significance for water treatment) in the top few millimeters of the sand layer. The Schmutzdecke consists of bacteria, fungi, protozoa, worms, and a range of aquatic life. The Schmutzdecke is the layer that provides the effective treatment in potable water treatment using the sand as the underlying support medium for this biological treatment layer. As water passes through the Schmutzdecke, particles of foreign matter are trapped in the layer and dissolved organic material is adsorbed and metabolized by the bacteria, fungi and protozoa. In the present invention, the filter media, such as a Reemay media, provides the support for the Schmutzdecke as it adsorbs and metabolizes the dissolved and suspended organic materials in the main fluid reservoir. The formation of a Schmutzdecke on the fluid filter is only made possible by the combination of the gentle 24 hour filtration and ozone/aeration provided by the apparatus according to the present invention, with the low concentration of ozone and treated purified air keeping a pool, spa, or water tank exceptionally clean. So clean, in fact, that the need to use chemicals is greatly reduced or eliminated entirely.

It should be noted that the ozone fluid treatment embodiments disclosed in the present application are configured to enable them to work in tandem with traditional high pressure fluid pump and high pressure filter systems that are commonly employed in conjunction with pools, spas, and other fluid reservoirs. Although these traditional pumps and filters are separate from the ozone system, according to embodiments of the invention, the same conduits used for feeding fluid to and from the reservoir and the fluid pump and high pressure filter may be used by the apparatus of the invention, as described below with respect to the embodiment shown in FIG. 3. The reason to add the ozone fluid treatment to a pool, spa, or water storage tank is that it greatly reduces or entirely eliminates the need for chlorine, chemicals, salts, clarifiers, Ph stabilizers, or other additives that are normally needed to keep a pool, spa, or other reservoir clean.

As ozone can be made from many different devices (such as a corona discharge ("CD") system), any gas that comprises ozone and clean treated air having a similar ratio to the ratio described above, can be used in an ozone water treatment system 100 according to the present invention. One consideration in determining the ratio of ozone to ambient air is the comfort of the users, as too high an ozone concentration would be irritating to the eyes and skin, and might inhibit the benefits of maintaining a biofilm filter on the system's fluid filter. On the other hand, users who did not observe proper hygiene, or who used lavish amounts of sun tan oils, or a pool or spa that is quite large or not covered, might require the use of an ozone generator with a higher output than the preferred apparatus mentioned here, or the use of multiple ozone generators and lift tubes. To make room for more bubbles, to treat fluid in larger capacity reservoirs, the lift tube diameter can also be increased.

Figure 1A:
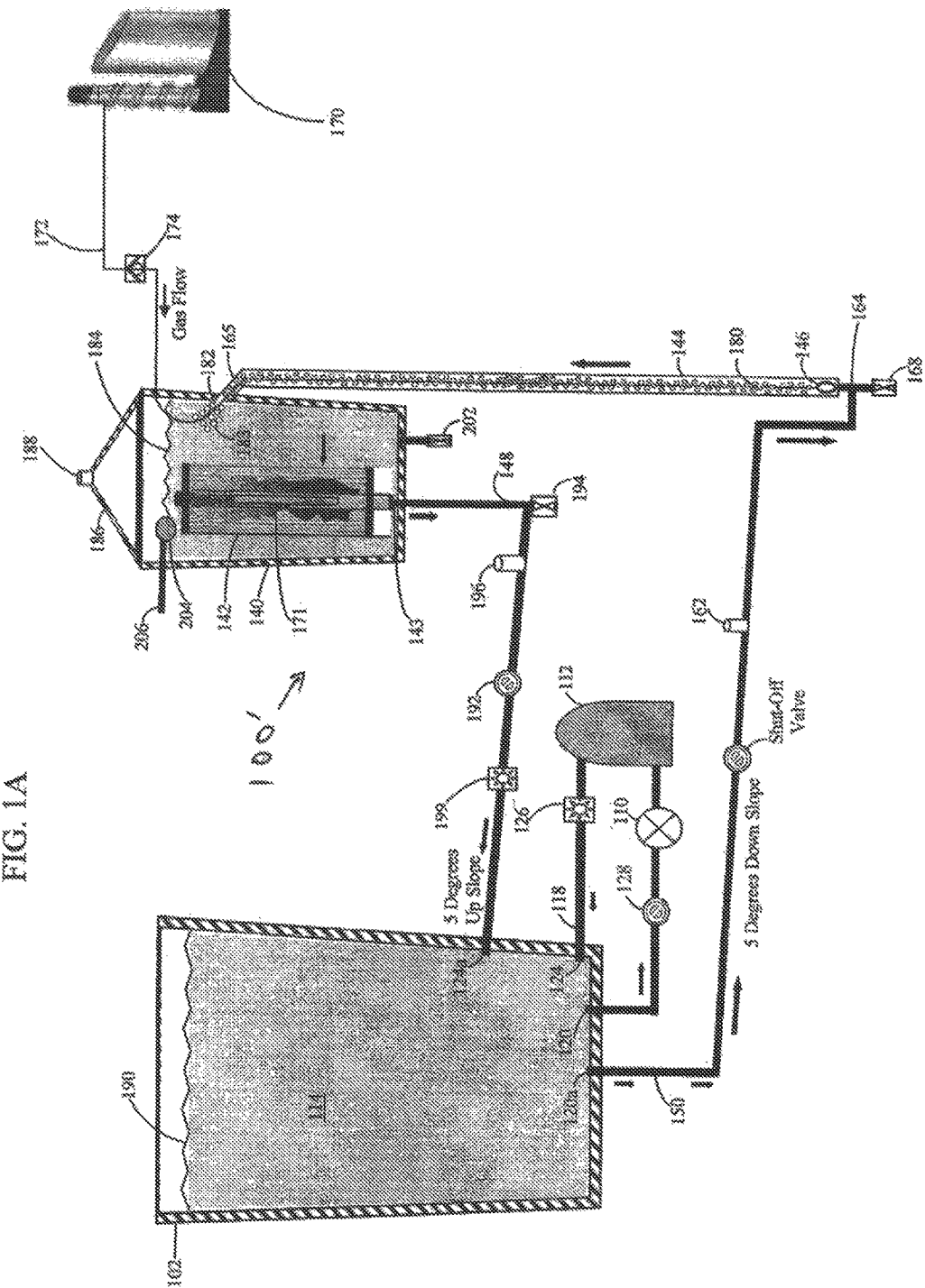
FIG. 1A illustrates the fluid treatment apparatus of FIG. 1 wherein the UV germicidal lamp is mounted in inside a filter in the auxiliary reservoir.

FIG. 1A illustrates an ozone-assisted fluid treatment apparatus 100' where the UV germicidal lamp 171 is positioned inside the filter 142 instead of in conduit 148. The UV germicidal lamp must be chosen for its design and installed in filter 142 in such a manner that the flow of fluid in the filter is not inhibited to a significant extent.

Figure 2:
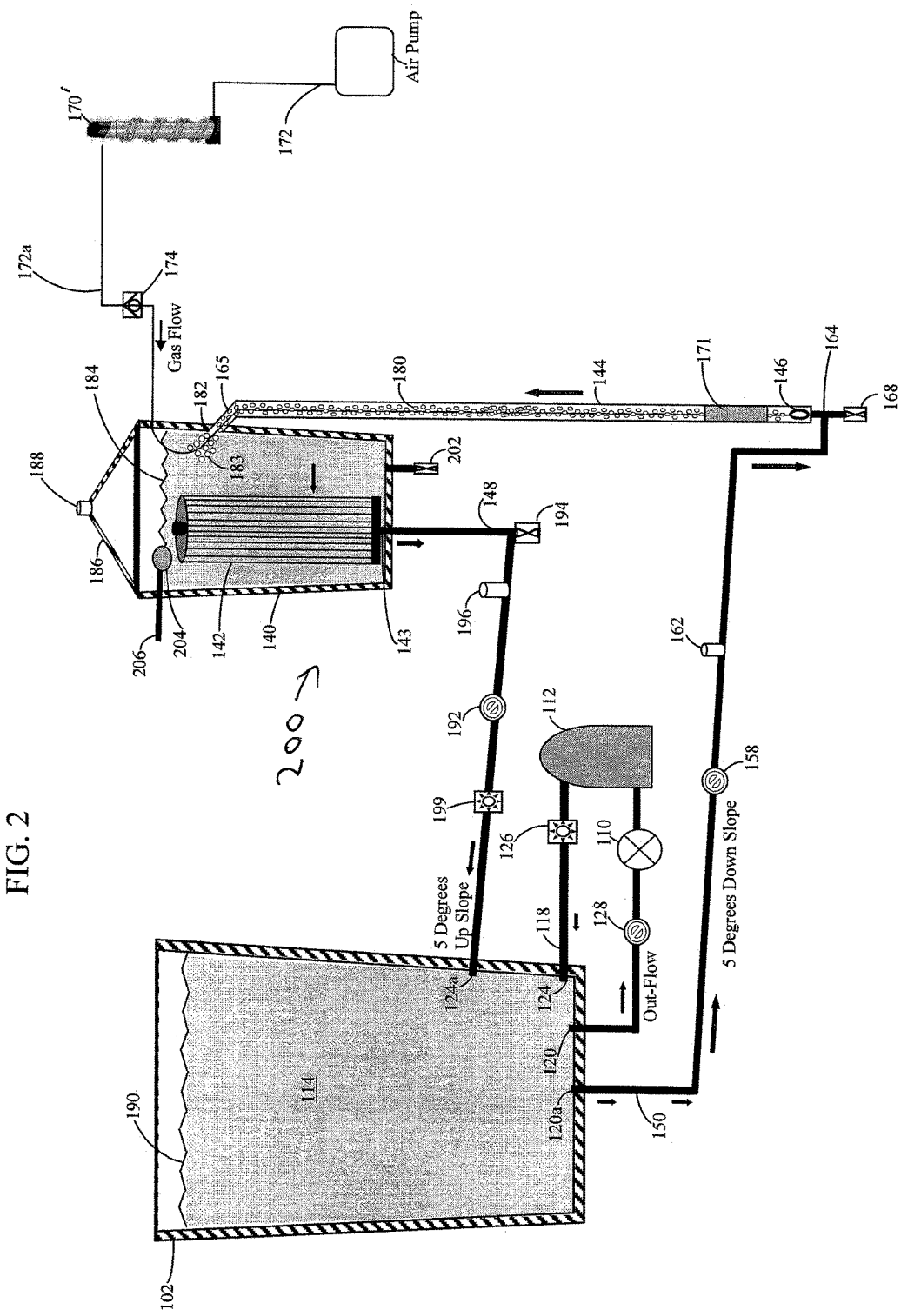
FIG. 2 illustrates an ozone-assisted fluid treatment apparatus for a fluid reservoir according to another embodiment of the present invention.

FIG. 2 illustrates an ozone-assisted fluid treatment apparatus 200 where the UV germicidal lamp 171 is positioned inside the lift tube 144. The UV germicidal lamp must be chosen for its design and installed in lift tube 144 in such a manner so that the ozonated gas bubbles do not coalesce and so that the upward flow of fluid in lift tube 144 is not inhibited.

FIG. 2 illustrates the use of a separate air pump 172 for providing pressurized air, which preferably is filtered, to an ozone generator 170'. The resultant ozonated air is then released into the fluid at the bottom of the lift tube 144.

In one embodiment, the pressurized air from the air pump is connected directly to a UV lamp at the bottom of the lift tube which functions to both create the ozonated fluid and to treat the fluid in lift tube 144 with 250-270 nm radiation to create the desired hydroxyl free radicals.

Figure 3:
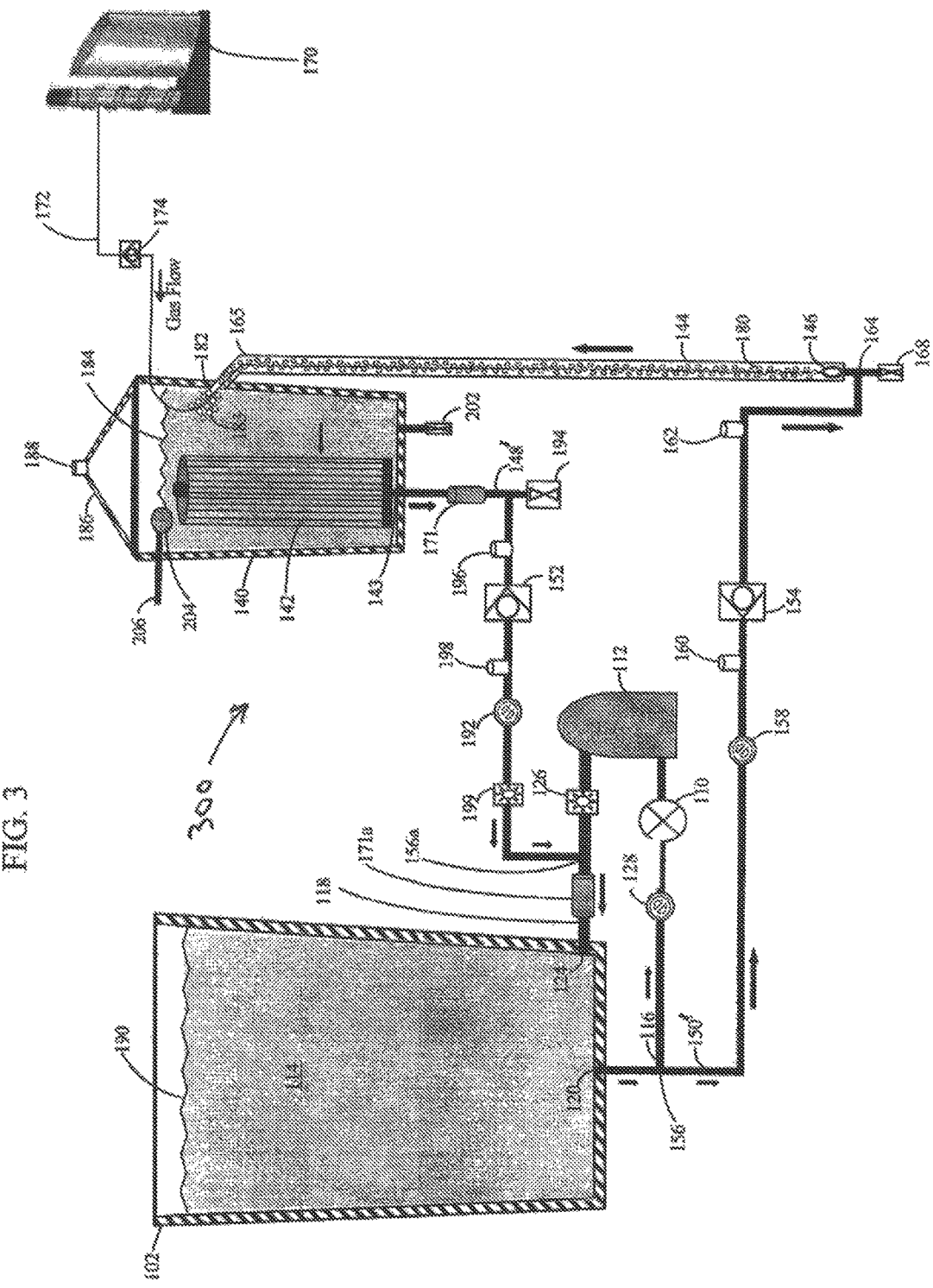
FIG. 3 illustrates an ozone-assisted fluid treatment apparatus for a fluid reservoir according to a third embodiment of the present invention.

In another embodiment, shown in FIG. 3, a fluid treatment apparatus 300 according to the present invention is connected to already existing conduits that connect fluid in a main reservoir 102 to a conventional high pressure water pump and filter assembly being used to filter the fluid, to augment the filtering provided by the conventional filter assembly. This eliminates the need for separate openings to be made in the main reservoir for installation of the fluid treatment apparatus according to the invention.

As seen in FIG. 3, a conventional high pressure water pump 110 and high pressure filter 112 filters the fluid 114 in main fluid reservoir 102 when the water pump 110 is on Filter 112 can be a conventional sand filter or the like. Fluid is fed to water pump 110 via a first conduit 116 whose first end is connected to main reservoir 102 at drain opening 120. Fluid from the water pump is fed to high pressure filter 112 by another conduit 122. The filtered fluid output from filter 112 is fed back to the main fluid reservoir 102 at opening 124 via a second conduit 118. The direction of fluid flow in conduits 116 and 118 are indicated by arrows next to these conduits. A conventional water heater 126 may be included in the path between the high pressure filter 112 and the main reservoir to enable heating of the fluid in main fluid reservoir 102. A conventional valve 128 may be included in first conduit 116 to isolate water pump 110 from main fluid reservoir 102 to enable maintenance of the water pump 110 or the like.

As seen in FIG. 3, fourth conduit 150' is connected in a conventional fashion at a junction 156 to first conduit 116 to enable fluid from a pool, spa, or other main fluid reservoir 102 to flow into fourth conduit 150'. Each of these conduits is preferably 2 inches in diameter. Fourth conduit 150' preferably has a slope of at least 5 degrees downwards to allow trapped air in the fourth conduit to exit into the first conduit and from there to the surface of the main fluid reservoir 102. The fourth conduit has an on-off fluid flow control valve 158 and two air release valves 160 and 162, one on each side of second check valve 154.

A third conduit 148' includes a first check valve 152 and fourth conduit 150' includes a second check valve 154. Check valve 152 functions to prevent the water pump 110 from, among other things: 1) draining water out of the auxiliary fluid reservoir 140 as the water pump 110 pumps water from the main fluid reservoir 102. Check valve 154 functions to prevent flooding of the auxiliary fluid reservoir 140 as the water pump 110 pumps fluid back into the main fluid reservoir 102 after the fluid has passed through the pump 110, sand filter 112, and heater 126.

The fluid path for fluid in the ozone-assisted water treatment apparatus 300 shown in FIG. 3 is therefore from the main fluid reservoir through the fourth conduit 150' first and fourth conduits 116 and 150', respectively, up the lift tube 144 and into the auxiliary fluid reservoir 140, and from there through filter 142 and back into the main fluid reservoir via the third conduit 148' and UV germicidal lamp 171 third and second conduits 148' and 118, respectively, with fluid flow being created by the bubbles in the lift tube 144 generated by diffuser 146. The location of the drain opening 120 and opening 124 in main fluid reservoir 102 can be adjusted (and preferably positioned as far apart as practical) so that there is maximum water flow and circulation of the entire contents of the main fluid reservoir through the operation of the fluid treatment apparatus 300.

Optional installations of the UV disinfection lamp are also shown in FIG. 3. For example, one UV lamp 171 is placed in conduit 148' and a second 171a is placed in conduit 118 for treating of the fluid before the fluid enters the main fluid reservoir 102.

Note that, where the water pump 110 and/or filter 112 are above the water level of the main fluid reservoir, i.e., drain line conduit 116 goes up to the water pump, 110, the fluid treatment apparatus 300 would have to be connected to conduit 116 below the water level 190 of the reservoir 102 in order for the apparatus 300 to function. In a case such as that, there is still no need to create a new hole in the reservoir 102 in order to connect up the apparatus 300. However, there may be the need to excavate beneath a surrounding deck or concrete pad in order to access the conduit 116.

As shown in FIG. 3, the 5 degree slope in fourth conduit 150' (and a similar slope in the third conduit, as described below) is intended to prevent air from getting trapped in the fluid line. Trapped air acts like a valve which restricts or prevents the fluid from flowing. It may not be necessary for a given fluid conduit to have a slope, especially where there is also an air release valve in the pipe. Nevertheless, the slope is useful for preventing the unwanted trapping of air.

Fourth conduit 150 goes down preferably at least several feet before connecting to the lower end of lift tube 144. In one embodiment, this connection is a 3-way connector 164 whose other end is connected to a drain valve 168. The fluid in fourth conduit 150 flows into lift tube 144 at its lower end 166. In lift tube 144, the fluid comes in contact with bubbles of ozone gas and air (so-called ozonated air) produced by diffuser 146. Diffuser 146 is preferably a conventional diffuser stone, although other devices known in the art can be used to create ozonated air bubbles in lift tube 144. The ozonated air is produced by an ozone generator 170 which pumps pressurized ozone and air into an ozonated air line 172, a fifth conduit, which connects to diffuser 146. Ozone generator 170 can be a CD, UV, or other form of ozone generator known in the art. An air line check valve 174 may be included in air line 172 to prevent fluid from lift tube 144 going back up air line 172 and into ozone generator 170 and damaging generator 170.

In the embodiment shown in FIGS. 1-3, the diffuser 146 is shown installed in lift tube 144 through its upper end 182. As is illustrated, the position of the diffuser 146 at the bottom of lift tube 144 is determined by the length of air line 172 that extends into the lift tube 144. Air line 172 may enter the auxiliary fluid reservoir via an opening 208. Diffuser 146 and the out-flow end of ozonated air line 172 can be positioned in lift tube 144 by either being lowered down into the lift tube through its open upper end, as shown, or in an alternate embodiment, not shown, positioned in the lift tube through a Y connector at the base of lift tube 144. Normally a Y connector would not be practical because the lift tube in many cases will be buried at least several feet into the ground. In such a case, it would be more convenient to lower the diffuser 146 directly down into the lift tube from its top. However, in some situations, for example if the main fluid reservoir comprises a plurality of storage tanks located on the top of a building, and the lift tube is attached to the side of the building, it may be very convenient to connect the ozone line through a Y connector at the bottom of the lift tube. In addition, one has to periodically clean the diffuser stone, and to do so, it needs to be removed from the lift tube 144 and soaked in Muriatic acid, in the case where there is the need to dissolve iron or manganese that may clog the diffuser stone over time, or some other conventional cleaner. This is another reason for inserting and removing the diffuser via the top of the lift tube 144 in most configurations, rather than through a Y connector at the base of the lift tube.

The diffuser 146 releases the ozonated air into the fluid in lift tube 144 in the form of thousands of small bubbles 180 of ozonated air. Lift tube 144 preferable has a diameter of 1.5 to 2 inches and a length of about 10 feet (3 meters). Lift tube 144 preferably is oriented straight up to prevent the ozonated air bubbles in lift tube 144 from coalescing. The rising ozonated air bubbles 180 pull the fluid upwards inside the lift tube 144. In general, the longer the lift tube the better, as it provides more contact time between the fluid and the ozonated air bubbles, to enable more ozone to both dissolve in the fluid and to produce more lift of the fluid and a higher fluid flow rate. As noted above, a limiting factor on the length of the lift tube is the ability of the diffuser to emit bubbles, since the fluid pressure exerted on the diffuser increases as the lift tube's length is increased and the diffuser is positioned deeper in the lift tube.

For larger pools, the lift tube and diffuser stones likely need to be larger. For example, in a pool of about 60,000 gallons, a 4" lift tube and 1"×5" diffuser stone was used. Also, the air pump for use with a larger fluid treatment system needed to have a capacity of about 80 liters per minute at the depth of 3.5 meters. The auxiliary tank also was larger in size and contained four filters. The amount of electricity used also went up proportionally.

The upper end 182 of lift tube 144 is open within auxiliary fluid reservoir 140. The lift tube 144 lifts the fluid into auxiliary fluid reservoir 144 under the force of the rising ozonated air bubbles in lift tube 144. The auxiliary fluid reservoir 144 should be located adjacent to the main fluid reservoir 102, preferably about 3 feet away, to provide some distance between the main fluid reservoir, when it is a pool or spa, and the area where the excess ozonated air dissipates in the air. Auxiliary fluid reservoir 140 may be fitted with a screen or semi-sealed top 186 to prevent insects, birds, leaves, dust, etc. from falling into the fluid in the auxiliary reservoir 140 and/or to capture the excess ozonated air emanating from the surface of the fluid in reservoir 140 for later use or conversion back to simple oxygen. A hole 188 in top 186 may be used to pipe away any excess ozonated air from reservoir 140 via another air line (not shown).

The auxiliary reservoir 140 should be preferably sized to hold about 30 to 50 gallons and be at a level so that the upper rim of the auxiliary reservoir is preferably about 12 inches above the fluid level of the main fluid reservoir 102. The bottom of auxiliary reservoir 140 is preferably at least about 20 inches below the surface of the fluid in the main fluid reservoir. Where the fluid filter 142 is positioned within auxiliary fluid reservoir 140, reservoir 140 needs to be of sufficient size to enable filter 142 to be fully submerged in the fluid contained in auxiliary reservoir 140 during normal operation of the water treatment apparatus 100 according to the present invention. When the main fluid reservoir 102 is empty, preferably all of the fluid in the auxiliary reservoir 140 should be able to drain back into the main fluid reservoir 102. A drain valve 202 may optionally be included at the bottom of reservoir 140.

The upper end 182 of lift tube 144 should be positioned at such a level as to be no higher than the fluid level 190 of the main fluid reservoir 102. A higher entry point might still be functional in certain situations, but the flow rate of the fluid in the lift tube 144 would decrease until at some point as the upper end 182 of the lift tube 144 is raised higher and higher above the fluid level 190 of the main fluid reservoir 102, the lift from the rising bubbles 180 would not be great enough to pull the fluid up and out of the lift tube 144 upper end 182. Note that bubbles 183 that have exited the upper end 182 of lift tube 144 also are in contact with the fluid in auxiliary reservoir 140, and therefore continue to cause ozone to dissolve into the fluid before the remaining bubbles finally emanate from the surface 184 of this fluid.

Preferably, UV germicidal lamp 171 is positioned inside of conduit 148 for irradiation of the ozonated fluid in conduit 148. However, UV germicidal lamp 171 can be positioned in alternate embodiments anywhere in the fluid stream after where the ozonated water is created by ozonated air injected into lift tube 144. Conduit 148 is preferably a 2 inch pipe positioned to have a downward slope of at least 5 degrees (to let trapped air escape and for easy maintenance). Conduit 148 is also fitted with an on-off fluid flow control valve 192, a drain valve 194, and two air release valves 196 and 198 one positioned on each side of check valve 152. Valve 192 and drain valve 194 function to prevent fluid from contaminating the main fluid reservoir 102 during cleaning or removal of filter 142, when filter 142 is positioned inside of auxiliary fluid reservoir 140. Air release valves 196 and 198 enable the release of any air trapped in the third conduit 148.

When filter 142 is positioned in auxiliary fluid reservoir 140, the base 143 of filter 142 is preferably directly connected to conduit 148 in order to enable fluid filtered by filter 142 to flow directly into conduit 148 after the fluid in auxiliary reservoir 140 has been filtered.

An optional overflow sensor (not shown) may be positioned above the normal fluid level 184 in auxiliary fluid reservoir 140. The overflow sensor operates to generate an alarm signal when sensor 200 detects when the fluid in reservoir 140 rises above a predetermined level. This typically will occur when the filter 142 has become clogged, thereby preventing fluid from passing through filter 142 and back into the main fluid reservoir 102. Once the filter is cleaned, the fluid level 184 would again be at its normal level of about 8 cm above the level 190 of the fluid in main reservoir 102 once the apparatus 100 is again operating. A drain valve 202 in auxiliary fluid reservoir 140 can be opened to allow fluid in auxiliary reservoir 140 to drain out if filter 142 is being cleaned in situ in reservoir 140. Fluid control valve 192 and fluid control valve 158 may need to be closed during cleaning of filter 142, depending on where filter 142 is located in the fluid path of apparatus 100, in order to prevent contaminating the fluid in the main fluid reservoir 102 during this cleaning process.

A float valve 204 is preferably positioned in said auxiliary fluid reservoir 140 for sensing when the fluid level 184 in said auxiliary fluid reservoir 140 drops below a predetermined level. A sixth conduit 206 connected between said auxiliary fluid reservoir 140 and an external fluid source (not shown) enables fluid to be added to said auxiliary fluid reservoir 140 in response to the sensing by float valve 204 of the low fluid level.

An optional heater 199 may be positioned somewhere in the fluid path of the fluid treatment apparatus 100. Such a heater might be a passive solar heater, for example, that would be operational during daylight hours.

The ozone generator preferably operates 24 hours a day. The ozone generator 170 typically uses about 200 Watts of electricity. Germs and spores are greatly reduced or even eliminated using the system disclosed in FIG. 1 without the use of any chemicals. Solids wastes, skin, hair and other impurities are continuously filtered from the fluid without use of additives or chemicals. The nitrogen cycle (nitrates, nitrites, and ammonia) seems to be disrupted and renders the fluid relatively pH stable. Algae growth in the pool or spa seems to be greatly reduced, requiring less cleaning cycles. The ozone produced by the UV lamps in ozone generator 170 is so small that ozone can be injected into the fluid 24 hours a day without irritating the users or inhibiting any possible bio-film that may add to the treatment of the water. This continuous filtration and use of a small amount of ozone inhibits bacteria and algae growth in the pool or spa. Harmful levels of ozone gas do not irritate the skin, eyes, throat, nose, lungs or bronchial tubes because the ozone gas is located in a separate tank several feet away.

Figure 4:
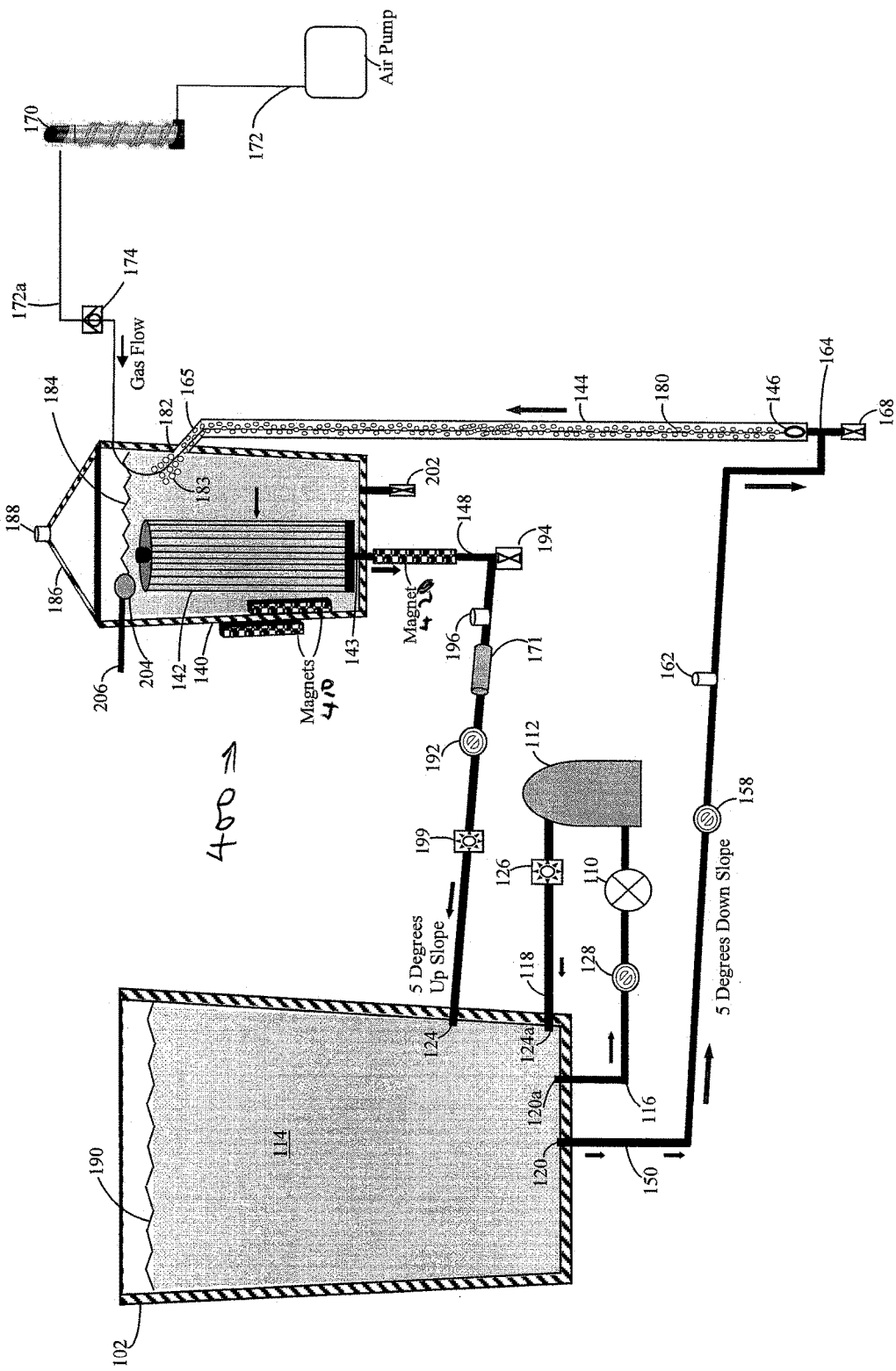
FIG. 4 illustrates an ozone-assisted fluid treatment apparatus for a fluid reservoir according to a fourth embodiment of the present invention.

FIG. 4 illustrates another embodiment of the invention where magnets 410 are also used in a fluid treatment apparatus 400. Magnetic water treatment may be described as using a powerful focused magnetic field on water flowing through a pipe. As shown in FIG. 4, magnets 410 may be placed along the inside of the auxiliary reservoir 140, the outside of reservoir 140, or around the out-flow conduit 148 at 420, or any combination of the above, wherever the installation is convenient.

As explained by GMX International on its website, magnetic water treatment is potentially of great benefit in Green Technology pool water treatment in terms of the reduction in use of oxidizing chemicals in water treatment. Magnetic treatment has been variously shown to stabilize solution pH, eliminate corrosion of materials and reduce system downtime. In addition to the reduction in running costs, physical water treatment is generally viewed as being more environmentally acceptable; reducing the use of the strong oxidizing chemicals conventionally employed for disinfecting. This study determines the efficacy of a magnetic treatment device on the inactivation of a model micro-organism (*Escherichia coli*), chlorine consumption and concomitant disinfecting by product formation in a swimming pool water analogue. Effects of magnetic water treatment on physical parameters such as scale deposition; conductivity and pH are reported, as well as the key performance determinants of chlorine consumption, micro-organism inactivation rate and trihalomethane (THM) formation. A commercially available magnetic treatment device (Magnetizer) was used throughout. It was found that in all cases chlorine loss was more rapid in the control than in the magnetically treated water. The bactericidal efficiency of the free chlorine was unaffected by magnetic treatment, such that the *E. coli* kill rate for a given disinfectant dose was increased by an average of 25% by this physical conditioning. In addition, it was found that generation of THMs was reduced by magnetic treatment at any one free chlorine level . . . . Many industries, including the swimming pool industry, are being urged by regulatory bodies such as PWTAG and pressure groups to use non-chemical treatment processes wherever possible (Gosling, 1996). PWTAG also places pressure on operators of swimming pools in the UK to employ the "least hazardous option" in terms of health and safety and environmental concerns (Gosling, 1996). The contaminants of swimming pool water are mainly urine, sweat and micro-organisms introduced by the swimmers. The major disinfectant used in swimming pool water treatment is sodium hypochlorite which has a bactericidal action that can be suppressed to some extent by interaction with other chemical contaminants (Black, 1996). Reaction with these organic contaminants result in the generation of disinfecting by products (DBPs), the simplest of which are the trihalomethanes (THMs). The nature of these products and the extent to which they are generated depends upon the prevailing physical and chemical conditions (PWTAG, 1995). However, they are generally undesirable as they are all at least suspected carcinogens, teratogens and mutagens (Gosling, 1996) . . . . Chemical effects . . . . The application of magnetic treatment to water has a long history, and has been used mostly to remove and control scale deposition (Donaldson, 1988; Baker and Judd, 1995). Calcium carbonate scale is estimated to cost industry around £1 billion per year (Darvill, 1993). The benefits of magnetic water treatment are claimed to include energy and water savings along with a range of benefits which prolong the life of the system's component parts and hence the life of the system itself. Magnetic treatment has been shown to stabilize pH, eliminate corrosion, reduce downtime, maintenance and cleaning costs and bacteria and remove the risks associated with the handling of chemical detergents such as sodium hypochlorite used in swimming pool water treatment (Ifill, 1994). Magnetic treatment has been successful in a range of systems including industrial heat exchangers, cooling towers, water treatment plants and household use (Baker and Judd, 1995), and may prove useful to the leisure industry in reducing the heating and disinfecting expenses involved in managing swimming pools. In addition to this physical water treatment is more environmentally acceptable, Green Technology, than the use of strong oxidizing chemicals. Biological effects . . . . Water is the major component of bacterial cells and the dissolved ion content in the intracellular water is the source of nutrition for the cell. One report shows that magnetic treatment of water can enhance the solubility of ions in the water, and proposes this the mechanism by which magnetic fields affect biological systems (Lin and Yotvat, 1990). It has also been proposed that magnetism may affect ion polarity, increasing membrane permeability and hence the amount of chlorine which can enter a cell, thereby enhancing its disinfecting properties (Ayrapetyan et al, 1994). A number of reports exist investigating the mechanisms by which magnetically treated water affects the cells and micro-organisms, the observed effects apparently varying from stimulatory to inhibitory depending on field strength and frequency of the magnetic field (Chizhov, 1975; Goodman et al, 1976; Moore, 1979; Berg, 1993). Many reports are concerned with the nature of the medium in which the micro-organisms exist (Berg, 1993; Okuno et al, 1993). Strong magnetic fields have been seen to enhance the growth of the model bacterium *Escherichia coli* cultured on a range of growth media (Okuno et al, 1993), but on the other hand, low strength alternating and pulsed fields have been shown to inhibit growth (Smith et al, 1993). Green Technology—Magnetic treatment of swimming pool water . . . . The last few years have seen the development of magnetic treatment devices (MTDs) for, amongst other applications, swimming pool water treatment. It is claimed by the suppliers of these devices that such devices have a number of beneficial effects including: reduction of scale, suppression of chlorine volatilization . . . inhibition of microbial growth. Of special interest, and as a direct consequence of the above, is filter surface loading or fouling. Fouling of sand filters in swimming pool treatment can be largely attributed to clogging of the surface of the filter by organic materials, such that backflushing becomes necessary long before the full capacity of the filter has been reached. The application of a magnetic field via the specified magnetic treatment device might thus be expected to reduce the fouling of the filters by: a) Inhibition of biological growth and/or b) Enhanced breakdown of organic materials due to the maintenance of higher chlorine levels in the water.

Summary of Effects of Magnetic Water Treatment:

1) The pH of pool simulant solutions increased when organic compounds were present and decreased when they were absent.

2) No changes in solution conductivity were found.

Magnetizer comment: This is to be expected since there was no evaporative water loss.

3) No scale was formed, so no conclusive results were obtained.

Magnetizer comment: With virtually no make up water or loss, scaling could not be significant.

4) The turbidity of the solutions increased by an undetermined amount.

Magnetizer comment: If a filter would have been used in the test rig, particles could have been filtered out.

5) No direct biocidal effects were observed.

Magnetizer comment: Test was only run in 8-hour day shift.

6) The cell death rate of *E coli* was significantly raised owing to increased aqueous chlorine.

7) Concentrations of free chlorine in solution were significantly increased by MWT at 0.8 and 1.2 ppm free chlorine doses.

8) Concentrations of combined chlorine in solution were significantly increased by MWT at and 1.2 ppm free chlorine doses.

9) Cell kill was improved at 0.4, 0.8 and 1.2 ppm initial free chlorine doses.

10) Chloroform production was suppressed at 0.4 and 1.2 ppm initial free chlorine doses; at 0.4 ppm this was significant.

See: http://gmxinternational.com/applications/swimming_pools/thesis-cranfield-u.html.

A typical type of magnetic unit is shown on the GMX International website: Model 400 GMX Magnetic Fluid Conditioner For ¼" to ½" Tubing or Pipe. Each Model 400 set consists of two pieces—one with a north polarity and the other with a south polarity (the GMX label covers the north pole piece). Model 400 should be installed wherever the fluid enters the equipment being treated. Single sets may be used as boosters for individual appliances, or on moderate temperature recirculation systems. The GMX label is placed over the north pole unit in each set. The direction the fluid flows through the tubing makes no difference. For best results when placing the Model 400 to treat a particular area or appliance, place the sets at least 8" to 12" upstream (before) the area or appliance to be treated. Do not place the Model 400 close to an electrical power line or electrical equipment capable of generating strong electrical fields, such as a welder or large electrical motor. See: http://gmxinternational.com/products/gmx400.htm.

Figure 5:
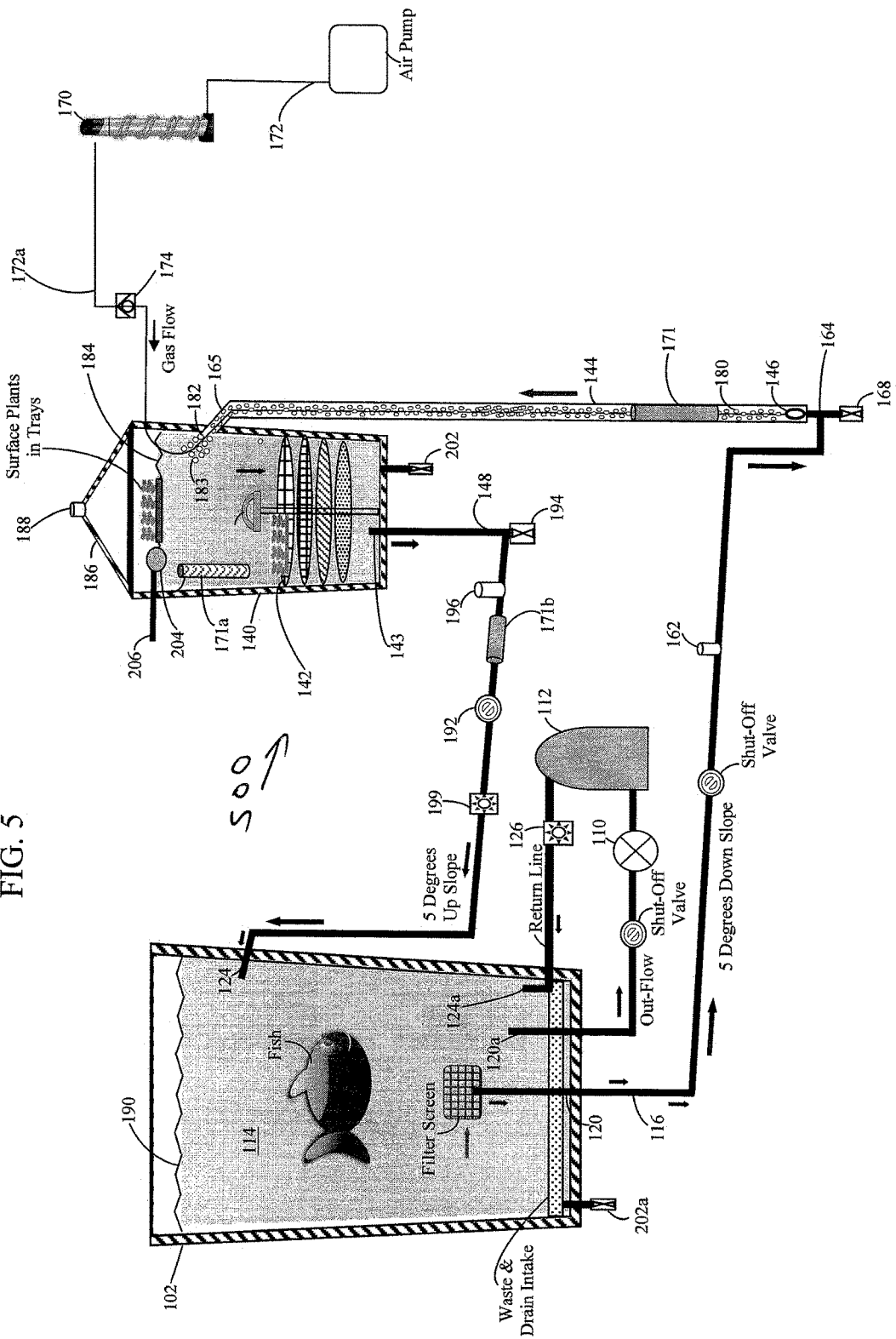
FIG. 5 illustrates an ozone-assisted fluid treatment apparatus for a fluid reservoir according to a fifth embodiment of the present invention.

FIG. 5 illustrates the use of a fluid treatment apparatus 500 according to the present invention in an aquaponics system or for an aquarium which has plants (either surface or submerged plant species). Fish require oxygen and clean water, which necessitates the removal of fish wastes and chemical compounds which are toxic (explained further below). The Apparatus 500 System circulates, oxygenates, and cleans the water for the fish. As shown in FIG. 14, the Apparatus 500 System is composed of an air pump providing filtered and cleaned pressurized air, which may or may not be passed through an ozone generator, and releases the treated air near the bottom of a lift tube which in turn is connected to the out-flow line of the fish tank, thereby causing the water in the fish tank to rise into the apparatus 500 reservoir 140. The cover 186 is transparent so that light can get in to grow the plants. As the water is rising in the lift tube, an optional ozone/UV germicidal lamp unit may provide additional treatment of the water and specifically, by creating hydroxyl free radicals, water entering the apparatus 500 may be used to grow surface plants or submerged plants and the plants' ability to assimilate chemicals and other wastes produced by the fish helps the plants grow and at the same time, filters the water (to be explained further below). An optional UV germicidal lamp may be suspended in the auxiliary reservoir 140 tank such that the water is subject to UV germicidal disinfection. By gravity, the water in the apparatus 500 tank flows back to the fish tank, but only after passing suitable filter screens or underwater plants/grow beds. As the water is piped back to the fish tank, additional UV germicidal lamps may be used for added disinfection. In such a system, depending upon the type of aquaponics or aquarium or fish involved, a conventional water pump and filtration system may be used in tandem with the apparatus 500 System. At the bottom of the fish tank, the drain includes a long intake with suitable design (for example, perforated holes in a series of connecting pipes leading to the drain . . . which would "suck" wastes collecting on the bottom Using the apparatus 500 for aquaponics, aquariums, hydroponics, aquatic farming, floating grow beds, etc., has many advantages, especially the oxygenation and filtration of the water. Further treatment with ozone and UV germicidal disinfection will enhance the water quality. A water pump usually does not oxygenate the water as efficiently, although there are designs using venturis to inject air into a water stream and other methods to oxygenate the water such as causing water to "splash" down upon the main reservoir. However, using a water pump for the purposes of aeration is not as efficient or complete as using an air pump designed for that purpose.

A company called Home Aquaponics System has described an aquaponics system as a process which combines traditional aquaculture with hydroponics. The animals and plants in an aquaponics system have a symbiotic relationship. Effluents from aquatic animals are used by plants as food. In the process, the plants purify water for the aquatic animals. Aquaculture and hydroponic farming techniques provide the basis for aquaponics systems in terms of complexity, size and the types of foods/plants grown in aquaponics systems. See: http://homeaquaponicssystem.com/basics/top-10-benefits-of-having-aquaponics-at-home.

Another explanation from Wikipedia (edited and with citations removed):

"Aquaponics refers to any system that combines conventional aquaculture (raising aquatic animals such as snails, fish, crayfish or prawns in tanks) with hydroponics (cultivating plants in water) in a symbiotic environment. In normal aquaculture, excretions from the animals being raised can accumulate in the water, increasing toxicity. In an aquaponic system, water from an aquaculture system is fed to a hydroponic system where the by-products are broken down by nitrification bacteria into nitrates and nitrites, which are utilized by the plants as nutrients, and the water is then (when purified) recirculated back to the aquaculture system. Aquaponics consists of two main parts, with the aquaculture part for raising aquatic animals and the hydroponics part for growing plants. Aquatic effluents, resulting from uneaten feed or raising animals like fish, accumulate in water due to the closed-system recirculation of most aquaculture systems. The effluent-rich water becomes toxic to the aquatic animal in high concentrations but this contain nutrients essential for plant growth. Although consisting primarily of these two parts, aquaponics systems are usually grouped into several components or subsystems responsible for the effective removal of solid wastes, for adding bases to neutralize acids, or for maintaining water oxygenation. Typical components include: Rearing tank: the tanks for raising and feeding the fish; Settling basin: a unit for catching uneaten food and detached biofilms, and for settling out fine particulates; Biofilter: a place where the nitrification bacteria can grow and convert ammonia into nitrates, which are usable by the plants; Hydroponics subsystem: the portion of the system where plants are grown by absorbing excess nutrients from the water; Sump: the lowest point in the system where the water flows to and from which it is pumped back to the rearing tanks. Depending on the sophistication and cost of the aquaponics system, the units for solids removal, biofiltration, and/or the hydroponics subsystem may be combined into one unit or subsystem, which prevents the water from flowing directly from the aquaculture part of the system to the hydroponics part.

A Deep Water Culture hydroponics system where plant grow directly into the effluent rich water without a soil medium. Plants can be spaced closer together because the roots do not need to expand outwards to support the weight of the plant. Plant placed into a nutrient rich water channel in a Nutrient film technique (NFT) system. Plants are grown as in hydroponics systems, with their roots immersed in the nutrient-rich effluent water. This enables them to filter out the ammonia that is toxic to the aquatic animals, or its metabolites. After the water has passed through the hydroponic subsystem, it is cleaned and oxygenated, and can return to the aquaculture vessels. This cycle is continuous. Common aquaponic applications of hydroponic systems include: Deep-water raft aquaponics: styrofoam rafts floating in a relatively deep aquaculture basin in troughs. Recirculating aquaponics: solid media such as gravel or clay beads, held in a container that is flooded with water from the aquaculture. This type of aquaponics is also known as closed-loop aquaponics. Reciprocating aquaponics: solid media in a container that is alternately flooded and drained utilizing different types of siphon drains. This type of aquaponics is also known as flood-and-drain aquaponics or ebb-and-flow aquaponics. Other systems use towers that are trickle-fed from the top, nutrient film technique channels, horizontal PVC pipes with holes for the pots, plastic barrels cut in half with gravel or rafts in them. Each approach has its own benefits. Most green leaf vegetables grow well in the hydroponic subsystem, although most profitable are varieties of chinese cabbage, lettuce, basil, roses, tomatoes, okra, cantaloupe and bell peppers.[23] Other species of vegetables that grow well in an aquaponic system include beans, peas, kohlrabi, watercress, taro, radishes, strawberries, melons, onions, turnips, parsnips, sweet potato and herbs.[citation needed] Since plants at different growth stages require different amounts of minerals and nutrients, plant harvesting is staggered with seedings growing at the same time as mature plants. This ensures stable nutrient content in the water because of continuous symbiotic cleansing of toxins from the water.

Freshwater fish are the most common aquatic animal raised using aquaponics, although freshwater crayfish and prawns are also sometimes used. In practice, tilapia are the most popular fish for home and commercial projects that are intended to raise edible fish, although barramundi, silver perch, eel-tailed catfish or tandanus catfish, jade perch and Murray cod are also used. For temperate climates when there isn't ability or desire to maintain water temperature, bluegill and catfish are suitable fish species for home systems. Koi and goldfish may also be used, if the fish in the system need not be edible. Nitrification, the aerobic conversion of ammonia into nitrates, is one of the most important functions in an aquaponics system as it reduces the toxicity of the water for fish, and allows the resulting nitrate compounds to be removed by the plants for nourishment.[22] Ammonia is steadily released into the water through the excreta and gills of fish as a product of their metabolism, but must be filtered out of the water since higher concentrations of ammonia (commonly between 0.5 and 1 ppm)[citation needed] can kill fish. Although plants can absorb ammonia from the water to some degree, nitrates are assimilated more easily,[23] thereby efficiently reducing the toxicity of the water for fish.[22] Ammonia can be converted into other nitrogenous compounds through healthy populations of Nitrosomonas: bacteria that convert ammonia into nitrites, and, Nitrobacter: bacteria that convert nitrites into nitrates.

In an aquaponics system, the bacteria responsible for this process form a biofilm on all solid surfaces throughout the system that are in constant contact with the water. The submerged roots of the vegetables combined have a large surface area where many bacteria can accumulate. Together with the concentrations of ammonia and nitrites in the water, the surface area determines the speed with which nitrification takes place. Care for these bacterial colonies is important as to regulate the full assimilation of ammonia and nitrite. This is why most aquaponics systems include a biofiltering unit, which helps facilitate growth of these microorganisms. Typically, after a system has stabilized ammonia levels range from 0.25 to 2.0 ppm; nitrite levels range from 0.25 to 1 ppm, and nitrate levels range from 2 to 150 ppm.[citation needed] During, system startup, spikes may occur in the levels of ammonia (up to 6.0 ppm) and nitrite (up to 15 ppm), with nitrate levels peaking later in the startup phase.[citation needed] Since the nitrification process acidifies the water, non-sodium bases such as potassium hydroxide or calcium hydroxide can be added for neutralizing the water's pH[22] if insufficient quantities are naturally present in the water to provide a buffer against acidification. In addition, selected minerals or nutrients such as iron can be added in addition to the fish waste that serves as the main source of nutrients to plants.[22] A good way to deal with solids buildup in aquaponics is the use of worms, which liquefy the solid organic matter so that it can be utilized by the plants and/or other animals in the system. For a worm-only growing method, please see Vermiponics.

The five main inputs to the system are water, oxygen, light, feed given to the aquatic animals, and electricity to pump, filter, and oxygenate the water. Spawn or fry may be added to replace grown fish that are taken out from the system to retain a stable system. In terms of outputs, an aquaponics system may continually yield plants such as vegetables grown in hydroponics, and edible aquatic species raised in an aquaculture. Typical build ratios are 0.5 to 1 square foot of grow space for every 1 U.S. gal (3.8 L) of aquaculture water in the system. 1 U.S. gal (3.8 L) of water can support between 0.5 lb (0.23 kg) and 1 lb (0.45 kg) of fish stock depending on aeration and filtration.[27] Ten primary guiding principles for creating successful aquaponics systems were issued by Dr. James Rakocy, the director of the aquaponics research team at the University of the Virgin Islands, based on extensive research done as part of the Agricultural Experiment Station aquaculture program.[28]

1) Use a feeding rate ratio for design calculations 2) Keep feed input relatively constant 3) Supplement with calcium, potassium and iron 4) Ensure good aeration 5) Remove solids 6) Be careful with aggregates 7) Oversize pipes 8) Use biological pest control 9) Ensure adequate biofiltration 10) Control pH As in all aquaculture based systems, stock feed usually consists of fish meal derived from lower-value species. Ongoing depletion of wild fish stocks makes this practice unsustainable. Organic fish feeds may prove to be a viable alternative that relieves this concern. Other alternatives include growing duckweed with an aquaponics system that feeds the same fish grown on the system,[29] excess worms grown from vermiculture composting, using prepared kitchen scraps,[30] as well as growing black soldier fly larvae to feed to the fish using composting grub growers.[31]

Aquaponic systems do not typically discharge or exchange water under normal operation, but instead recirculate and reuse water very effectively. The system relies on the relationship between the animals and the plants to maintain a stable aquatic environment that experience a minimum of fluctuation in ambient nutrient and oxygen levels. Water is added only to replace water loss from absorption and transpiration by plants, evaporation into the air from surface water, overflow from the system from rainfall, and removal of biomass such as settled solid wastes from the system. As a result, aquaponics uses approximately 2% of the water that a conventionally irrigated farm requires for the same vegetable production.[citation needed] This allows for aquaponic production of both crops and fish in areas where water or fertile land is scarce. Aquaponic systems can also be used to replicate controlled wetland conditions. Constructed wetlands can be useful for biofiltration and treatment of typical household sewage. [32] The nutrient-filled overflow water can be accumulated in catchment tanks, and reused to accelerate growth of crops planted in soil, or it may be pumped back into the aquaponic system to top up the water level.

Figure 6:
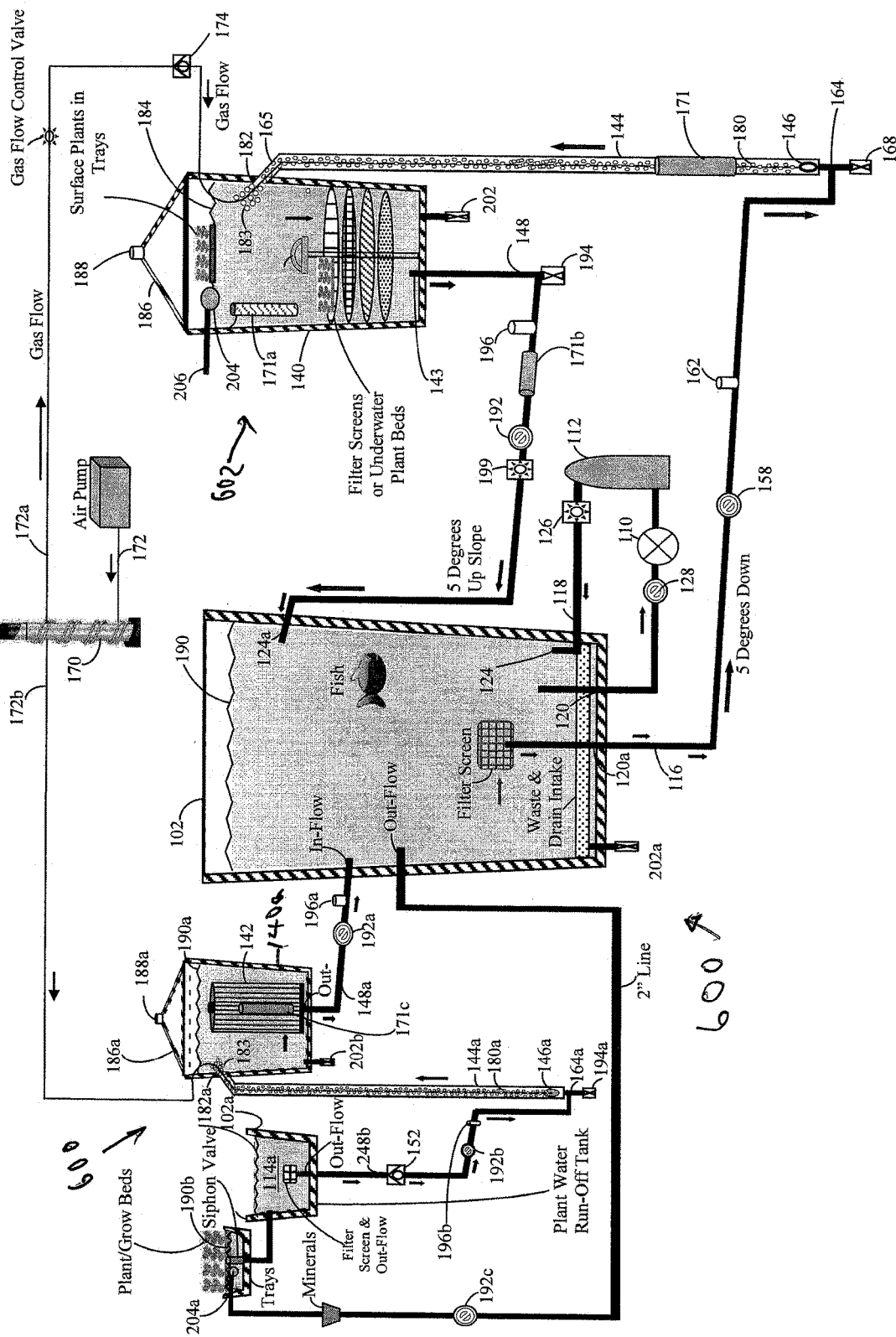
FIG. 6 illustrates a sixth embodiment of the present invention wherein two fluid treatment systems are used together with two auxiliary reservoirs.

Aquaponic installations rely in varying degrees on man-made energy, technological solutions, and environmental control to achieve recirculation and water/ambient temperatures. However, if a system is designed with energy conservation in mind, using alternative energy and a reduced number of pumps by letting the water flow downwards as much as possible, it can be highly energy efficient. While careful design can minimize the risk, aquaponics systems can have multiple 'single points of failure' where problems such as an electrical failure or a pipe blockage can lead to a complete loss of fish stock." https://en.wikipedia.org/wiki/Aquaponics FIG. 6 illustrates the use of two fluid treatment systems, at 600 and 602 together with two auxiliary reservoirs 140 and 142 (referred to as the "Fish Tank 140" and the "Plant Tank 140a"). The apparatus 600 system used with the Fish Tank 140a is identical to the system 300 in FIG. 3 described above, with the exception of an additional out-flow line from the fish tank to a water tank described as "Plant/Grow Beds" which is part of the apparatus 600 used with the Plant Tank. Also shown is an in-flow line from the Plant Tank 140a back to the main fluid reservoir 102, described below.

The water level in the Plant/Grow Bed tank is lower than the water level in the reservoir 102. The out-flow line from the reservoir 102 allows waste water from the reservoir 102 to flow into the plant grow beds. The incoming water to the plant grow beds is controlled by a water level float valve and one may optionally mix minerals into the incoming water for the plants. In some aquaponic systems, certain types of plants require their roots to be free of water for periodic intervals and for this reason, an automatic siphon valve is illustrated.

On the website Japan Aquaponics, it explains the automatic siphon (edited for brevity):

"Research has shown that the slow flooding, and then rapid draining of the growbeds, provides for excellent access to nutrients for the plants, and high oxygenation for the plant roots. The rapid draining draws oxygen down fully into the roots and this is vital for good growth. Moreover, once set up they can provide a simple mechanical means of flooding and draining a growbed using simple fittings that have no moving parts and require no electricity. At its simplest, a siphon is a mechanism for moving water from one reservoir to another, lower reservoir. The benefit of a siphon is that it is capable of raising water over a barrier—and this is what makes it distinctive, and of practical benefit to aquaponics. Siphons work largely because of hydrostatic pressure, i.e. the force that fluid molecules exert on each other because of the earth's gravitational pull. We can exploit small differences of pressure to enable us to move water around in aquaponics. Hydrostatic pressure is what causes water to flow out of a hole in a cup—it forces fluid forwards or outwards. You will hear the term, auto-siphon used in aquaponics—an auto-siphon is simply a siphon that can start and stop itself in response to changing water levels." See: http://www.japan-aquaponics.com/bell-siphon-guide.html.

As shown in FIG. 6, the auto-siphon in the Plant/Grow Bed tank empties the water into a second lower tank called the "Plant Water Run-Off Tank" ("run-off" tank) which drains into a pipe connected to a lift tube which brings the water up to the level of the apparatus 600 reservoir 140a. The drain pipe from the run-off tank has a check valve to prevent water from the apparatus 600 from going backwards and flooding or overflowing the run-off tank. A solenoid valve would also work and create less back pressure. The lift tube connected to the run-off tank brings the water up to the apparatus 600 reservoir 140a. Inside reservoir 140a, the water passes through a filter which may optionally have a UV Lamp positioned on the inside of the filter and then drains back to the main reservoir 102.

The design illustrated in FIG. 6 illustrates a situation where different plant grow beds may be at lower levels and/or are the type of plants which require a run-off tank, and the second "lift tube" used with the apparatus 600 allows for all the fish tanks (reservoirs 102) and grow beds to be connected so that the plants get the most nutrients and the fish get the water most beneficial for growth and health.

In FIG. 6, the level of the Plant Water Run-Off Tank is well below the level of reservoir 102, however, to raise the water level to a sufficient height so that the water in apparatus 600 can flow by gravity into the reservoir 102 can be done by adjusting the height of the run-off tank and by adjusting the size of the lift tube or by adjusting the flow rate/pressure of the air/gas being diffused at the bottom of the lift tube, and also by adjusting the height of the diffuser stone itself. Reducing the size of the lift tube will decrease the flow of the water, but increase the height the water can by lifted. Increasing the flow rate and/or pressure of the air/gas being diffused will also lift the water higher. Adjusting the height of the diffuser stone will affect the flow rate and height of the water being lifted. If two air pumps are used, it is easier to size and adjust the height of the water coming up the lift tube. If only one air pump is being used, the Gas Flow Control Valve will be another way to adjust the air pressure and therefore, the relative height of the water attained in each lift tube. Finally, partially opening or closing the various shut-off valves which has the effect of restricting the water flow will affect the height of the water in the lift tubes.

Each of the two apparatus' 600 and 602 may be operated by either a single air pump (split air stream) or two separate air pumps, and used optionally with an ozone generator, UV germicidal lamp, or just an air pump. With the water flow available, it would be reasonable to combine other technologies such as magnets, ultrasonics, probiotics, structured water, mineral supplements, etc. Normally, aquaponics, aquariums, fish farms, hydroponics use a water pump and gravity to provide water flowing to the various tanks. Using a water pump may be necessary to lift water from a very low tank to a very high tank. However, if water flow can be accomplished with air pumps, this would have the additional benefit of adding oxygen and being able to mix ozone and/or disinfect the water with UV germicidal light at the same time using the apparatus 600. The use of apparatus 600 with a water pump to assist in the filtering of waste products from the aquatic life or to use with a CHOP system (constant height one pump) and sump tank or automatic syphon drain would be beneficial, depending upon the designs. One of the great benefits of aquaponics is that the plants filter the waste from the aquatic life (fish, prawns, etc.) and the water used is a small fraction of the water used to grow vegetables and fruit in normal agricultural methods. Apparatus 600 can make it all work better by saturating the water with oxygen and optionally be using ozone, UV, magnetics, ultrasonics, mineral supplements, etc., as all of these technologies can exploit the flow of aerated water (something a simple water pump cannot do, unless it splashes the water upon the surface or elevates the water so that it can trickle down a vertical grow bed, water fall, or fountain).

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the following claims and their equivalents.

What is claimed is:

1. An apparatus for ozone-aerating and filtering fluid in a main fluid reservoir comprising:
    an auxiliary fluid reservoir positioned adjacent to and outside of the main fluid reservoir;
    a lift tube positioned outside of the main fluid reservoir and having an upper end and a lower end, said lift tube upper end open within the auxiliary fluid reservoir, said lift tube extending below the auxiliary fluid reservoir a predetermined length;
    a first conduit for enabling fluid in the auxiliary fluid reservoir to flow into the main fluid reservoir;
    a second conduit for enabling fluid to flow by gravity from the main fluid reservoir into the lower end of said lift tube;
    a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first conduit and into the main fluid reservoir at the same time causing fluid to be drawn through said second conduit from the main fluid reservoir and into said lift tube;

a UV germicidal lamp positioned in said lift tube above said diffuser; and a low pressure fluid filter positioned outside of the main reservoir and in the fluid path firmed by said first and second conduits, said lift tube, and said auxiliary fluid reservoir, for filtering the fluid flowing therein.

2. The apparatus of claim 1, wherein said low pressure fluid filter is positioned inside said auxiliary fluid reservoir to filter the ozone-aerated fluid before the fluid enters said first third conduit.

3. The apparatus of claim 1, wherein a second UV germicidal lamp is positioned in the first conduit downstream of said fluid filter.

4. The apparatus of claim 1, wherein said diffuser is inserted into said lift tube at its upper end.

5. The apparatus of claim 1, further comprising:
a float valve positioned in said auxiliary fluid reservoir for sensing when the fluid level in said auxiliary fluid reservoir drops below a predetermined level; and
a third conduit connected between said auxiliary fluid reservoir and an external fluid source to enable fluid to be added to said auxiliary fluid reservoir in response to said sensing.

6. The apparatus of claim 1, wherein said lift tube is at least ten feet long and has a diameter of between about one and one half inches and two inches.

7. The apparatus of claim 1, wherein the second conduit has a slope of at least 5 degrees down in the direction from the main reservoir to the lower end of the lift tube, and wherein the first conduit has a slope of at least 5 degrees up in the direction from the auxiliary fluid reservoir to the main reservoir.

8. The apparatus of claim 1, further comprising an ozone-capturing device positioned above the auxiliary fluid reservoir for capturing undissolved excess ozone gas emanating from the fluid in the auxiliary fluid reservoir.

9. The apparatus of claim 1, wherein filtering surfaces of the low pressure fluid filter supports a filtering layer of bio-film comprising organic material.

10. The apparatus of claim 1, further comprising:
an out-flow valve in said first conduit to control the flow of ozone-aerated fluid from the auxiliary fluid reservoir to the main fluid reservoir;
an in-flow valve in said second conduit to control the flow of fluid from the main fluid reservoir to the lower end of said lift tube; and
a first drain valve coupled to the lower portion of the auxiliary fluid reservoir for enabling drainage of the fluid in the auxiliary fluid reservoir when the first drain valve is open, such that, when the in-flow valve and the out-flow valve are closed, the low pressure fluid filter and the auxiliary fluid reservoir can be cleaned without contaminating the fluid in the main fluid reservoir.

11. The apparatus of claim 10, further comprising:
a second drain valve coupled to the lower end of said lift tube for enabling drainage of the fluid in said lift tube.

12. An apparatus for ozone-aerating and filtering fluid in a main fluid reservoir, said main fluid reservoir including a high pressure water pump and a high pressure filter, a first conduit for enabling fluid in said main fluid reservoir to flow to said water pump and high pressure filter, and a second conduit for enabling fluid to flow from said water pump and high pressure filter to said main fluid reservoir, for enabling the circulation of fluid in said main fluid reservoir through said water pump and high pressure filter when the water pump is on, comprising:

an auxiliary fluid reservoir positioned adjacent to and outside of the main fluid reservoir;

a lift tube positioned outside of the main fluid reservoir and having an upper end and a lower end, said lift tube upper end open within the auxiliary fluid reservoir, said lift tube extending below the auxiliary fluid reservoir a predetermined length;

a third conduit for enabling fluid in the auxiliary fluid reservoir to flow into the main fluid reservoir via said second conduit, said third conduit including a first check valve for preventing fluid flow in a direction from said second conduit to said auxiliary fluid reservoir;

a fourth conduit for enabling fluid to flow by gravity from the main fluid reservoir into the lower end of said lift tube via said first conduit, said fourth conduit including a second check valve for preventing fluid flow in a direction from the lower end of said lift tube to said first conduit;

a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first fluid conduit and into the main fluid reservoir at the same time causing fluid to be drawn through said second fluid conduit from the main fluid reservoir and into said lift tube;

a UV germicidal lamp positioned in said lift tube above said diffuser; and a low pressure fluid filter positioned outside of the main reservoir and in the fluid path formed by said third and fourth fluid conduits, said lift tube, and said auxiliary fluid reservoir, for filtering the fluid flowing therein.

13. The apparatus of claim 12, wherein a second UV germicidal lamp is positioned in the second conduit downstream of said fluid filter.

14. A method for ozone-aerating and filtering fluid in a main fluid reservoir comprising the steps of:
injecting ozonated air into a lift tube external to a main fluid reservoir whose bottom is connected to the main fluid reservoir by a second conduit to cause fluid from said main fluid reservoir to flow through said second conduit and up said lift tube;
collecting said ozonated fluid in an auxiliary reservoir positioned at least in part above said lift tube;
causing said fluid in said auxiliary reservoir to flow back into the main fluid reservoir via a first conduit; and
treating said ozonated fluid with a UV germicidal lamp positioned in said lift tube downstream of where said ozonated air is injected into said lift tube.

15. The method of claim 14 further comprising filtering the ozonated fluid in said auxiliary reservoir.

16. The method of claim 15 wherein a second UV germicidal lamp is positioned in said first conduit downstream of where said fluid is filtered to treat the fluid flow between said auxiliary fluid reservoir and said main fluid reservoir.

* * * * *